(12) United States Patent
Lawrence

(10) Patent No.: US 12,613,671 B2
(45) Date of Patent: Apr. 28, 2026

(54) METHODS AND APPARATUS TO IMPROVE SCREEN SHARING BASED ON IDENTIFICATION OF IRRELEVANT VIDEO FRAMES FROM INTERACTIVE CONTEXT

(71) Applicant: Intel Corporation, Santa Clara, CA (US)

(72) Inventor: Sean J.W. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 17/711,938

(22) Filed: Apr. 1, 2022

(65) Prior Publication Data

US 2022/0222030 A1    Jul. 14, 2022

(51) Int. Cl.
G06F 3/14 (2006.01)
G06V 20/40 (2022.01)
H04L 65/403 (2022.01)

(52) U.S. Cl.
CPC ............ G06F 3/1454 (2013.01); G06V 20/41 (2022.01); H04L 65/403 (2013.01)

(58) Field of Classification Search
CPC ...... G06F 3/1454; G06V 20/41; H04L 65/403
See application file for complete search history.

(56) References Cited

U.S. PATENT DOCUMENTS

| | | | |
|---|---|---|---|
| 11,245,735 B1* | 2/2022 | Kwatra | H04L 65/1089 |
| 2006/0161622 A1* | 7/2006 | Montgomery | G06F 15/16 |
| | | | 709/204 |
| 2012/0304077 A1* | 11/2012 | Hornback, Jr. | G09G 5/363 |
| | | | 715/753 |
| 2018/0373485 A1* | 12/2018 | Cyr | G06F 3/04845 |
| 2019/0166330 A1* | 5/2019 | Ma | H04L 65/403 |
| 2022/0086204 A1* | 3/2022 | Nakamura | G06F 3/04842 |
| 2023/0222236 A1* | 7/2023 | Devarao | G06N 3/0464 |
| | | | 726/29 |

* cited by examiner

*Primary Examiner* — Olisa Anwah
(74) *Attorney, Agent, or Firm* — Hanley, Flight & Zimmerman, LLC

(57)    ABSTRACT

Methods, apparatus, systems, and articles of manufacture are disclosed to improve screen sharing based on identification of irrelevant video frames from interactive context. Example apparatus disclosed herein are to process input data and application contextual data to determine an interaction classification for a classification interval in a screen sharing event initiated in a video conference and identify, based on the interaction classification, video frames of the screen sharing event that correspond to the classification interval to exclude from a transport stream for the video conference associated with the classification interval. Disclosed example apparatus are further to exclude the identified video frames from the transport stream and provide remaining video frames of the screen sharing event to a video encoder for inclusion in the transport stream.

22 Claims, 15 Drawing Sheets

VIDEO CONFERENCING CIRCUITRY 112

USER INTERFACE 202

VIDEO FRAME GENERATION CIRCUITRY 204

INTERACTIVE CONTEXT FRAME SELECTION CIRCUITRY 206

VIDEO ENCODER CIRCUITRY 208

TRANSPORT STREAM GENERATION CIRCUITRY 210

COMMUNICATION CIRCUITRY 212

METHODS AND APPARATUS TO IMPROVE SCREEN SHARING BASED ON IDENTIFICATION OF IRRELEVANT VIDEO FRAMES FROM INTERACTIVE CONTEXT

FIELD OF THE DISCLOSURE

This disclosure relates generally to screen sharing and, more particularly, to methods and apparatus for improve screen sharing based on identification of irrelevant video frames from interactive context.

BACKGROUND

Virtual conferencing platforms and video conferencing platforms are indispensable tools for collaboration in most industrial, commercial, academic, and governmental environments. In some examples, interactions through remote communication platforms represent a large amount of the total interactions happening in large organizations. Virtual conferencing platforms and video conferencing platforms provide the ability of sharing visual data to all participants.

BRIEF DESCRIPTION OF THE DRAWINGS

In general, the same reference numbers will be used throughout the drawing(s) and accompanying written description to refer to the same or like parts. The figures are not to scale.

Figure 1:
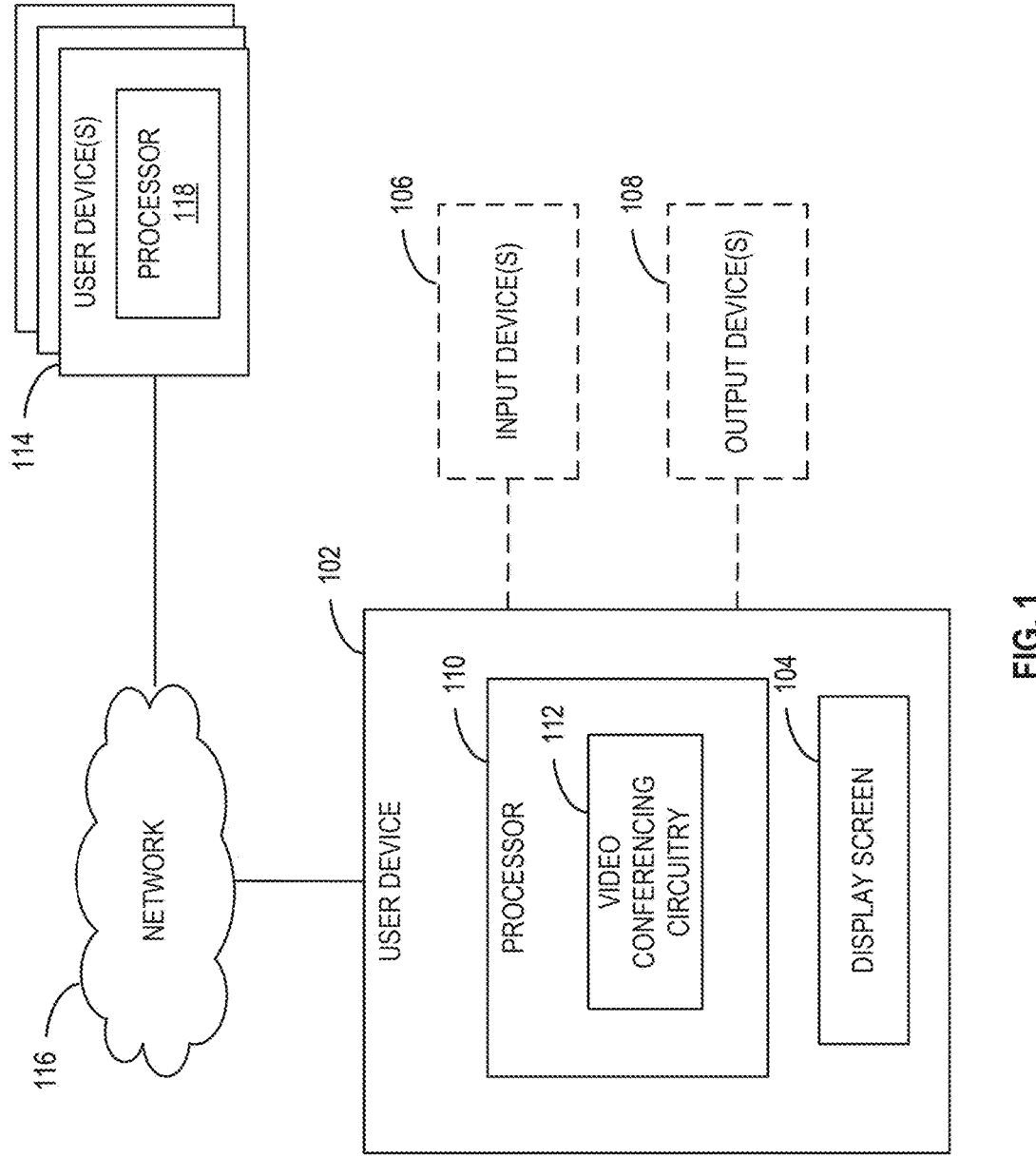
FIG. 1 is a block diagram of an example environment in which the teachings of this disclosure may be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Virtual conferencing platforms and video conferencing platforms are indispensable tools for collaboration in most industrial, commercial, academic, and governmental environments. In some examples, interactions through remote communication platforms represent a large amount of the total interactions occurring in large organizations. Video conferencing platforms typically include screen sharing capabilities that allows for the sharing of content between users/participants of the video conferencing meeting. Screen sharing typically involves displaying relatively static content of applications, such as, for example, Microsoft® PowerPoint, Microsoft® Word, etc., with transitions between these stable display states. Content in stable/static state can result in little to no network utilization as minimal data may be transferred due to delta/video encoding that is performed on the content during the video conferencing meeting. However, transitions between the stable states (e.g., scrolling, switching between applications, etc.) can cause additional and. potentially, unnecessary data transfer on the network. For example, if a transition between stable states takes one second (conservatively), and there are fifteen frames per second of content streaming during a screen sharing event, this would result in fifteen frames of unnecessary data on the network for each transition.

Current virtual conferencing platforms and video conferencing platforms encode video frames using multiple encoding schemes in an attempt to optimize streaming data rate. However, in current virtual conferencing platforms and video conferencing platforms, screen sharing during video conferencing meetings has a certain bandwidth requirement based on the nature of the content and the available communication link throughput. When content changes/transitions are significant, the large amount of information change results in spikes of video data on the network. These large spikes can affect audio quality for bandwidth-constrained client connections in the form of audio drops on the video conference meeting.

Examples disclosed herein determine interaction intent from user interactions with the content of a screen sharing event to identify scenarios where video frames can be dropped/removed from the transport stream to improve (e.g., optimize) video sharing/streaming during a video conferencing meeting. As used herein, video frames correspond to image frames that are included in a video. Examples disclosed herein determine the interaction intent from user interactions with the content of the screen sharing event by analyzing inputs from various input devices, application usage and sharing context. Examples disclosed herein obtain user input to understand the intent to show content during the screen sharing event based on the interaction with the content that is represented in the user input. Examples disclosed herein use the sequence of user input, location on the screen, and time between each user input to predict intended usage in combination with knowing the application (or applications) being interacted with. Examples disclosed herein identify and predict instances of screen sharing content changes using the user input and application contextual data (e.g., what application(s) are open and/or being interacted with). Examples disclosed herein use the predicted instances of screen sharing content changes and identify data that is not necessary to include to reduce (e.g., minimize) the spikes of streamed video data for bandwidth constraints.

Examples disclosed herein process user input data and application contextual data using a machine learning model to predict whether instances of screen sharing content changes should be included in the video stream of a screen sharing event. Examples disclosed herein process the user input and application contextual data to determine which video frame changes during a screen sharing event can be removed from the input to a video conferencing system before the video frames are processed/encoded and transmitted to the network. Examples disclosed herein analyze the client device streaming content in combination with user interactive inputs via input devices (e.g., a keyboard, a mouse, a screen, etc.). In examples disclosed herein, the user interactive inputs are used as triggers/transition identifiers based on the content being rendered in the screen sharing event at that time. Examples disclosed herein use the machine learning model to identify instances of unnecessary transitions in the content, and the corresponding video frames are marked. Examples disclosed herein remove marked video frames from the transmitted set of video frames to other users/clients in the video conferencing meeting. Examples disclosed herein improve video and audio content streaming experiences during video conferencing meetings. Examples disclosed herein reduce (e.g., minimize) streaming glitches for network bandwidth-constrained clients/users that can be caused by video data spikes due to instances of large transitions of video content (e.g., scrolling quickly, switching applications, etc.).

FIG. 1 is a schematic illustration of an example environment 100 in which teachings of this disclosure may be implemented. The example environment 100 includes an example user device 102 for participating in video conferencing meetings. The example user device 102 can be, for example, a smartphone, a personal computing (PC) device such as for example, a laptop, a desktop, an electronic tablet, a hybrid or convertible PC, etc., and/or other suitable devices. In some examples, the user device 102 includes an example display screen 104. In some examples disclosed herein, the display screen 104 is carried by a housing of the user device 102 and accessible via an exterior surface of the housing and, thus, can be considered an on-board user input device for the user device 102.

In some examples, the user device 102 additionally or alternatively includes external devices communicatively coupled to the user device 102, such as example input device(s) 106 and example output device(s) 108. The example input device(s) 106 may be human interface devices (HID) such as, for example, a keyboard, a mouse, a touchpad, a touch screen, etc. The example output device(s) 108 may be headphones, speakers, ear buds, etc. The example input device(s) 106 and the example output device(s) 108 can be communicatively coupled to the user device 102 via one or more wired or wireless connections. The example user device 102 also includes an example processor 110 that executes software to interpret and output response(s) based on user input event(s) (e.g., touch event(s), keyboard input(s), mouse input(s) etc.) via the display screen 104 and/or via external device (e.g., a keyboard, a mouse, etc.).

In the illustrated example of FIG. 1, the processor 110 includes example video conferencing circuitry 112 to participate in a video conferencing meeting with other user device(s). The video conferencing circuitry 112 manages a user's participation in a video conferencing meeting via the user device 102. The video conferencing circuitry 112 analyzes inputs from the user of the user device 102 related to the video conferencing meeting via the display screen 104 and/or via external device (the input device(s) 106). For example, the user of the user device 102 may make a selection to join or leave the video conferencing meeting. In another example, the user of the user device 102 may make a selection to share video during a screen sharing event/ screen sharing session during the video conferencing meeting. As used herein, a screen sharing event and/or a screen sharing session refer to a time period between when screen sharing is activated by a user of the user device 102 and when the screen sharing is terminated by the user. The video conferencing circuitry 112 processes user selections/interactions with the user device 102 along with information associated with applications that are open and/or being interacted with on the user device 102 during a video conferencing meeting. The video conferencing circuitry 112 generates and encodes video frames for a screen sharing event during the video conferencing meeting based on the user selections/interactions. The video conferencing circuitry 112 transmits a transport stream including encoded video data and audio data to other user devices(s) via the network 116. An example implementation of the example video conferencing circuitry 112 is disclosed below in conjunction with FIG. 2. In some examples, the video conferencing circuitry 112 can be implemented by circuitry included in the processor 110, one or more applications executed by the processor 110, or any combination thereof.

In the illustrated example of FIG. 1, the user device 102 communicates with example user device(s) 114 via the example network 116. In some examples, the network 116 can be the Internet and/or any other suitable external network. The user device(s) 114 can be, for example, smartphones and/or personal computing (PC) device(s) such as for example, a laptop, a desktop, an electronic tablet, a hybrid or convertible PC, etc. The user device 102 can transmit data to and receive data from example processor(s) 118 of the user device(s) 114. In examples disclosed herein, the user device 102 can transmit audio and/or image (e.g., video) data to and receive audio and/or image (e.g., video) data from the user device(s) 114 during a video conferencing meeting. In some examples, the user device(s) 114 correspond to other participants included in the video conferencing meeting. As such, in some examples, the processor(s) 118 of the user device(s) 114 also include/implement respective instances of the video conferencing circuitry 112. These components may be implemented in software, firmware, hardware, or in combination of two or more of software, firmware, and hardware.

Figure 2:
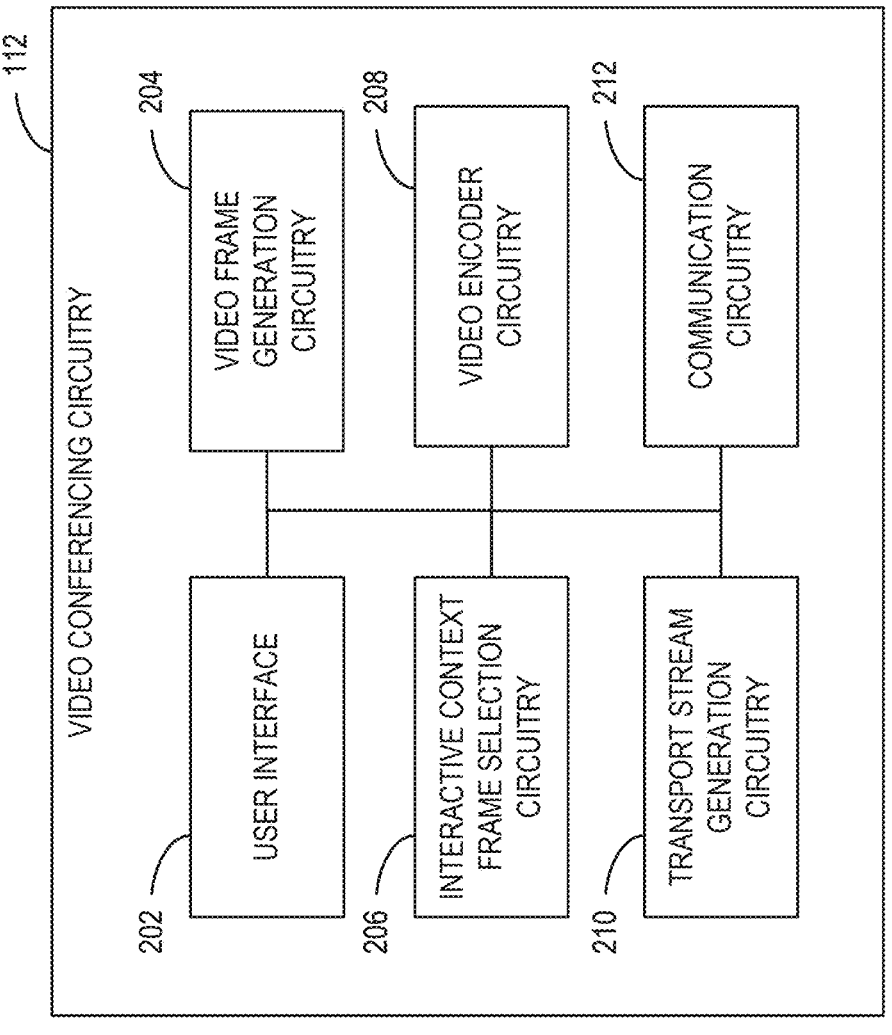
FIG. 2 is a block diagram of example video conferencing circuitry included in the example environment of FIG. 1.

FIG. 2 is a block diagram of example video conferencing circuitry 112 included in the example environment 100 of FIG. 1 to participate in a video conferencing meeting with other user device(s). The video conferencing circuitry 112 of FIG. 2 may be instantiated (e.g., creating an instance of, bring into being for any length of time, materialize, implement, etc.) by processor circuitry such as a central processing unit executing instructions. Additionally or alternatively, the video conferencing circuitry 112 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example video conferencing circuitry 112 of FIG. 2 includes an example user interface 202 to obtain user selection data related to a video conferencing meeting from a user. The user interface 202 obtains and analyzes inputs from the user of the user device 102 of FIG. 1 related to the video conferencing meeting via the display screen 104 and/or via one or more input devices (the input device(s) 106). In some examples, the user interface 202 obtains a selection from the user of the user device 102 to join or leave the video conferencing meeting. In some examples, the user interface 202 obtains a selection from the user of the user device 102 to start a screen sharing event to share video during the video conferencing meeting. In some examples, if the user interface 202 identifies/obtains a user selection to start screen sharing, the user interface 202 notifies the interactive context frame selection circuitry 206 that a screen sharing event has begun and to process the data associated with the video content being shared.

In some examples, the video conferencing circuitry 112 includes means for obtaining user selection in a video conferencing meeting. For example, the means for obtaining may be implemented by the user interface 202. In some examples, the user interface 202 may be instantiated by processor circuitry such as the example processor circuitry 1212 of FIG. 12. For instance, the user interface 202 may be instantiated by the example general purpose processor circuitry 1300 of FIG. 13 executing machine executable instructions such as that implemented by at least blocks 1002, 1006 of FIG. 10. In some examples, the user interface 202 may be instantiated by hardware logic circuitry, which may be implemented by an ASIC or the FPGA circuitry 1400 of FIG. 14 structured to perform operations corresponding to the machine readable instructions. Additionally or alternatively, the user interface 202 may be instantiated by any other combination of hardware, software, and/or firmware. For example, the user interface 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the video conferencing circuitry 112 includes example video frame generation circuitry 204 to generate video frame(s). The video frame generation circuitry 204 obtains video inputs from the user device 102 (e.g., from an internal video camera) and/or one or more external devices (e.g., an external video camera attachment). The example video conferencing circuitry 112 generates the video frames from the video inputs to include in the transport stream of video and audio data for the video conferencing meeting.

In some examples, the video conferencing circuitry 112 includes means for generating video frame(s). For example, the means for generating may be implemented by video frame generation circuitry 204. In some examples, the video frame generation circuitry 204 may be instantiated by processor circuitry such as the example processor circuitry 1212 of FIG. 12. For instance, the video frame generation circuitry 204 may be instantiated by the example general purpose processor circuitry 1300 of FIG. 13 executing machine executable instructions such as that implemented by at least block 1004 of FIG. 10. In some examples, the video frame generation circuitry 204 may be instantiated by hardware logic circuitry, which may be implemented by an ASIC or the FPGA circuitry 1400 of FIG. 14 structured to perform operations corresponding to the machine readable instructions. Additionally or alternatively, the video frame generation circuitry 204 may be instantiated by any other combination of hardware, software, and/or firmware. For example, the video frame generation circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The video conferencing circuitry 112 of FIG. 2 includes example interactive context frame selection circuitry 206 to perform interactive context frame selection on the generated video frame(s) from the example video frame generation circuitry 204. The example interactive context frame selection circuitry 206 determines if there is a screen sharing event from the user interface 202. In some examples, the interactive context frame selection circuitry 206 determines interaction intent from user interactions with the content of the screen sharing event (obtained by the example user interface 202) to identify scenarios in which video frames can be dropped/removed from the transport stream to improve (e.g., optimize) video sharing/streaming during a video conferencing meeting. The example interactive context frame selection circuitry 206 obtains user inputs from the example user interface 202 to identify user interactions with the content of the screen sharing event. The example interactive context frame selection circuitry 206 obtains/analyzes application contextual data (e.g., application usage information, applications currently open on the user device 102, etc.) to determine the intent to show content during the screen sharing event based. The example interactive context frame selection circuitry 206 uses a sequence of user input, location on the screen, and time between each user input, in combination with knowing the application (or applications) being interacted with, to predict intended usage during the screen sharing event. The interactive context frame selection circuitry 206 processes the user input and application contextual data (e.g., what application(s) are open and/or being interacted with) using a machine learning model to predict instances of screen sharing content changes and identify video frames that are not necessary to include in the transport stream to reduce (e.g., minimize) the spikes of streamed video data, which could cause degraded performance due to bandwidth constraints. The example interactive context frame selection circuitry 206 removes video frames from the transport stream that were identified as corresponding to instances of unnecessary transitions in the content based on the machine learning model. An example implementation of the example interactive context frame selection circuitry 206 is disclosed below in conjunction with FIG. 3.

In some examples, the video conferencing circuitry 112 includes means for selecting generated video frame(s). For example, the means for selecting may be implemented by interactive context frame selection circuitry 206. In some examples, the interactive context frame selection circuitry 206 may be instantiated by processor circuitry such as the example processor circuitry 1212 of FIG. 12. For instance, the interactive context frame selection circuitry 206 may be instantiated by the example general purpose processor circuitry 1300 of FIG. 13 executing machine executable instructions such as that implemented by at least block 1008 of FIG. 10. In some examples, the interactive context frame selection circuitry 206 may be instantiated by hardware logic circuitry, which may be implemented by an ASIC or the FPGA circuitry 1400 of FIG. 14 structured to perform operations corresponding to the machine readable instructions. Additionally or alternatively, the interactive context frame selection circuitry 206 may be instantiated by any other combination of hardware, software, and/or firmware. For example, the interactive context frame selection circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The video conferencing circuitry 112 of FIG. 2 includes example video encoder circuitry 208 to encode the selected video frame(s) from the example interactive context frame selection circuitry 206. The example video encoder circuitry 208 performs encoding (e.g., image compression) on the selected video frames to convert the video frames to a digital format that reduces the size of the video frame before transmitting over the network (e.g., network 116 of FIG. 1). The example video encoder circuitry 208 encodes the video frames that were not removed by the example interactive context frame selection circuitry 206, and does not include the video frames that were removed by the interactive context frame selection circuitry 206 as corresponding to instances of unnecessary transitions in the content of the screen sharing event.

In some examples, the video conferencing circuitry 112 includes means for encoding selected video frame(s). For example, the means for encoding may be implemented by video encoder circuitry 208. In some examples, the video encoder circuitry 208 may be instantiated by processor circuitry such as the example processor circuitry 1212 of FIG. 12. For instance, the video encoder circuitry 208 may be instantiated by the example general purpose processor circuitry 1300 of FIG. 13 executing machine executable instructions such as that implemented by at least block 1010 of FIG. 10. In some examples, the video encoder circuitry 208 may be instantiated by hardware logic circuitry, which may be implemented by an ASIC or the FPGA circuitry 1400 of FIG. 14 structured to perform operations corresponding to the machine readable instructions. Additionally or alternatively, the video encoder circuitry 208 may be instantiated by any other combination of hardware, software, and/or firmware. For example, the video encoder circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the video conferencing circuitry 112 includes example transport stream generation circuitry 210 to generate a transport stream from the encoded video frame(s). The example transport stream generation circuitry 210 generates a transport stream (e.g., a standard digital container format for transmission and storage of audio data, video data, etc.) using the encoded video frames from the example video encoder circuitry 208. The example transport stream generation circuitry 210 combines audio data and video data (e.g., the encoded video frames) to generate the transport stream. For example, the transport stream generation circuitry 210 multiplexes the audio data and video data to generate the transport stream for the video conferencing meeting. The example transport stream generation circuitry 210 provides the generated transport stream to the example communication circuitry 212.

In some examples, the video conferencing circuitry 112 includes means for generating a transport stream. For example, the means for generating may be implemented by transport stream generation circuitry 210. In some examples, the transport stream generation circuitry 210 may be instantiated by processor circuitry such as the example processor circuitry 1212 of FIG. 12. For instance, the transport stream generation circuitry 210 may be instantiated by the example general purpose processor circuitry 1300 of FIG. 13 executing machine executable instructions such as that implemented by at least block 1012 of FIG. 10. In some examples, the transport stream generation circuitry 210 may be instantiated by hardware logic circuitry, which may be implemented by an ASIC or the FPGA circuitry 1400 of FIG. 14 structured to perform operations corresponding to the machine readable instructions. Additionally or alternatively, the transport stream generation circuitry 210 may be instantiated by any other combination of hardware, software, and/or firmware. For example, the transport stream generation circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The video conferencing circuitry 112 of FIG. 2 includes example communication circuitry 212 to transmit the transport stream from the transport stream generation circuitry 210. The example communication circuitry 212 generates a communication stack for the transport stream of the video conferencing meeting. The example communication circuitry 212 transmits the communication stack to other user devices participating in the video conferencing meeting via the network (e.g., the network 116 of FIG. 1).

In some examples, the video conferencing circuitry 112 includes means for transmitting a transport stream. For example, the means for transmitting may be implemented by communication circuitry 212. In some examples, the communication circuitry 212 may be instantiated by processor circuitry such as the example processor circuitry 1212 of FIG. 12. For instance, the communication circuitry 212 may be instantiated by the example general purpose processor circuitry 1300 of FIG. 13 executing machine executable instructions such as that implemented by at least block 1014 of FIG. 10. In some examples, the communication circuitry 212 may be instantiated by hardware logic circuitry, which may be implemented by an ASIC or the FPGA circuitry 1400 of FIG. 14 structured to perform operations corresponding to the machine readable instructions. Additionally or alternatively, the communication circuitry 212 may be instantiated by any other combination of hardware, software, and/or firmware. For example, the communication circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
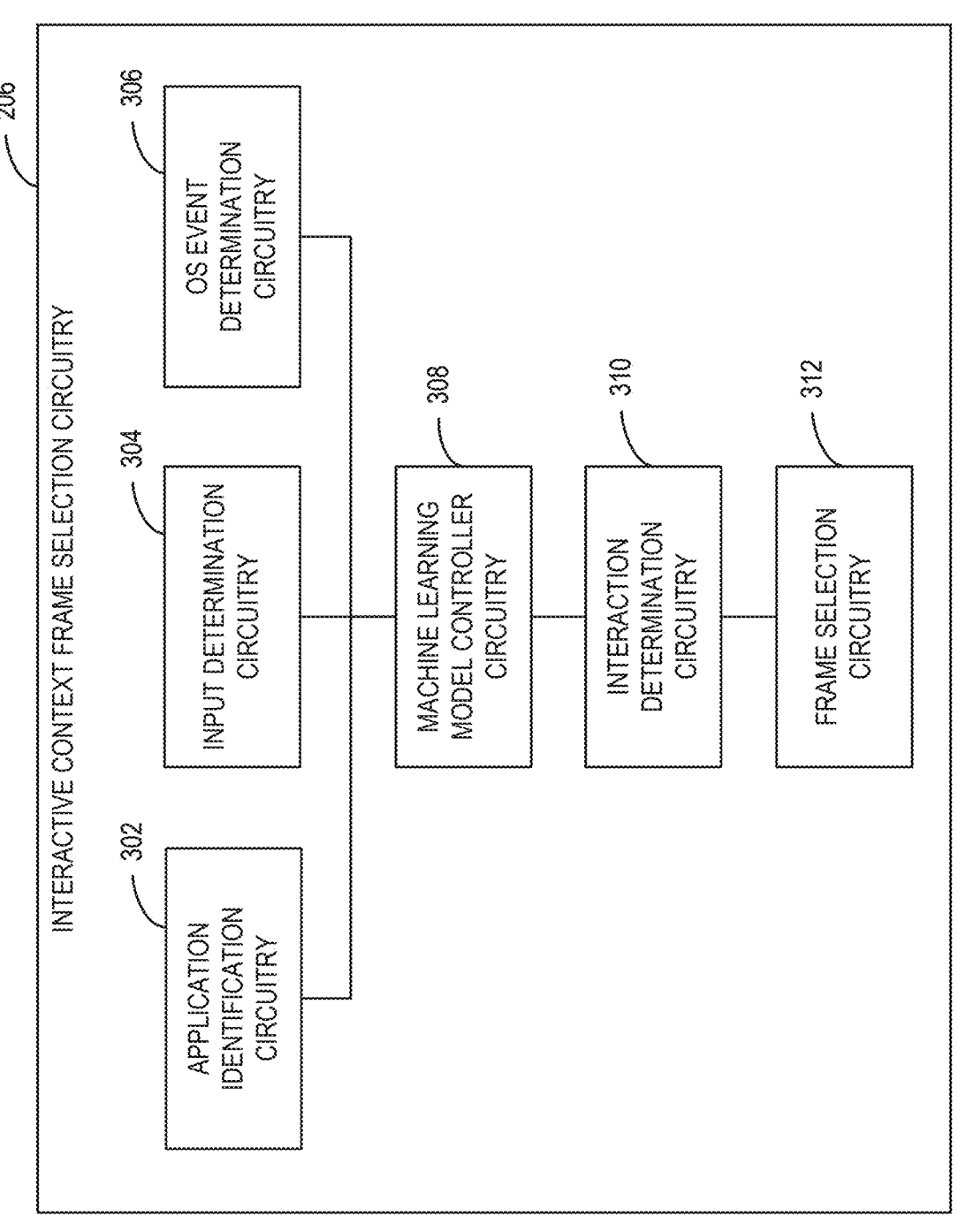
FIG. 3 is a block diagram of example interactive context frame selection circuitry included in the example video conferencing circuitry of FIG. 2.

FIG. 3 is a block diagram of the interactive context frame selection circuitry 206 included in the example video conferencing circuitry 112 of FIG. 2 to perform context frame selection from generated video frames using user inputs and application information during a screen sharing even in a video conference. The interactive context frame selection circuitry 206 of FIG. 3 may be instantiated (e.g., creating an instance of, bring into being for any length of time, materialize, implement, etc.) by processor circuitry such as a central processing unit executing instructions. Additionally or alternatively, the interactive context frame selection circuitry 206 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example interactive context frame selection circuitry 206 of FIG. 3 includes example application identification circuitry 302 to obtain application contextual data in response to the start of (e.g., activation of, initiation of, etc.) a screen sharing event. The example application identification circuitry 302 obtains the application contextual data by identifying an application being interacted with during a screen sharing event and identifying any additional applications open on the user device 102. The example application identification circuitry 302 collects/obtains a sequence of application contextual data over a period of time (e.g., during the screen sharing event of the video conferencing meeting, until termination of the screen sharing event, etc.).

In some examples, the interactive context frame selection circuitry 206 includes means for obtaining application contextual data. For example, the means for obtaining may be implemented by application identification circuitry 302. In some examples, the application identification circuitry 302 may be instantiated by processor circuitry such as the example processor circuitry 1212 of FIG. 12. For instance, the application identification circuitry 302 may be instantiated by the example general purpose processor circuitry 1300 of FIG. 13 executing machine executable instructions such as that implemented by at least block 1102 of FIG. 11. In some examples, the application identification circuitry 302 may be instantiated by hardware logic circuitry, which may be implemented by an ASIC or the FPGA circuitry 1400 of FIG. 14 structured to perform operations corresponding to the machine readable instructions. Additionally or alternatively, the application identification circuitry 302 may be instantiated by any other combination of hardware, software, and/or firmware. For example, the application identification circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the interactive context frame selection circuitry 206 includes example input determination circuitry 304 to obtain human interface device (HID) inputs. The example input determination circuitry 304 obtains input data from a user (e.g., via the user interface 202 of FIG. 2) in response to a start (e.g., activation of, initiation of, etc.) of a screen sharing event during a video conferencing meeting. In examples disclosed herein, the input data from the user includes HID inputs that are collected from HID devices (e.g., a mouse, a keyboard, a touchpad, etc.), such as the input device(s) 106 of FIG. 1. In some examples, the input data from the user can include screen scrolling, user clicks/selections on a screen, etc. The example input determination circuitry 304 collects/obtains a sequence of input data from the user over a period of time (e.g., during the screen sharing event, until termination of the screen sharing event, etc.).

In some examples, the interactive context frame selection circuitry 206 includes means for obtaining input data. For example, the means for obtaining may be implemented by input determination circuitry 304. In some examples, the input determination circuitry 304 may be instantiated by processor circuitry such as the example processor circuitry 1212 of FIG. 12. For instance, the input determination circuitry 304 may be instantiated by the example general purpose processor circuitry 1300 of FIG. 13 executing machine executable instructions such as that implemented by at least block 1104 of FIG. 11. In some examples, the input determination circuitry 304 may be instantiated by hardware logic circuitry, which may be implemented by an ASIC or the FPGA circuitry 1400 of FIG. 14 structured to perform operations corresponding to the machine readable instructions. Additionally or alternatively, the input determination circuitry 304 may be instantiated by any other combination of hardware, software, and/or firmware. For example, the input determination circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The interactive context frame selection circuitry 206 of FIG. 3 includes example operating system (OS) event determination circuitry 306 to obtain operating system events corresponding to the HID inputs. In some examples, the operating system events include interrupts generated by hardware devices (e.g., interrupts triggered by a keystroke on a keyboard, mouse position, etc.), software interrupt instructions (e.g., an application program requesting reading or writing data to/from memory), or state changes in polling of input devices (e.g., the input device(s) 106 of FIG. 1) and/or application programs. The example OS event determination circuitry 306 identifies OS events on the user device 102 that correspond to the HID inputs obtained by the example input determination circuitry 304. The example OS event determination circuitry 306 obtains the operating system events executed in response to the HID inputs collected by the user device 102. In some examples, the operating system events are included in the input data obtained by the example input determination circuitry 304.

In some examples, the interactive context frame selection circuitry 206 includes means for obtaining OS events. For example, the means for obtaining may be implemented by OS event determination circuitry 306. In some examples, the OS event determination circuitry 306 may be instantiated by processor circuitry such as the example processor circuitry 1212 of FIG. 12. For instance, the OS event determination circuitry 306 may be instantiated by the example general purpose processor circuitry 1300 of FIG. 13 executing machine executable instructions such as that implemented by at least block 1106 of FIG. 11. In some examples, the OS event determination circuitry 306 may be instantiated by hardware logic circuitry, which may be implemented by an ASIC or the FPGA circuitry 1400 of FIG. 14 structured to perform operations corresponding to the machine readable instructions. Additionally or alternatively, the OS event determination circuitry 306 may be instantiated by any other combination of hardware, software, and/or firmware. For example, the OS event determination circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The interactive context frame selection circuitry 206 of FIG. 3 includes example machine learning model controller circuitry 308 to process the input data and the application contextual data with an interactive context machine learning model. The example machine learning model controller circuitry 308 runs the interactive context machine learning model using the input data (e.g., the HID inputs obtained by the input determination circuitry 304 and the OS events obtained by the OS event determination circuitry 306) and the identified application contextual data (e.g., if an application is being interacted with during a screen sharing event and if there are any additional applications open) obtained by the application identification circuitry 302. In some examples, the machine learning model controller circuitry 308 continuously runs the interactive context machine learning model to monitor available input data and application contextual data to identify screen sharing content changes in the video frame data (e.g., image frames from video data). In some examples, the machine learning model controller circuitry 308 processes the input data and application contextual data at a sampling rate (e.g., every second). In some examples, the machine learning model controller circuitry 308 processes the input data and application contextual data for screen sharing content changes in the video frame data and initializes a classification interval in response to identifying a screen sharing content change. In some examples, a classification interval is a period of time between different screen sharing content changes. In some examples, the machine learning model controller circuitry 308 terminates a classification interval after a designated period of time, when the machine learning model controller circuitry 308 does not detect a screen sharing content change, etc. The example machine learning model controller circuitry 308 processes the input data and the application contextual data with the interactive context machine learning model to determine an interaction classification during the classification interval of the video conferencing meeting. In some examples, the machine learning model controller circuitry 308 processing a sequence of input data and a corresponding sequence of application contextual data obtained during the classification interval using the interactive context machine learning model to identify patterns of input for the user interaction intent during the screen sharing event. The example machine learning model controller circuitry 308 predicts whether instances of screen sharing content changes in the video frame data during the classification interval should be included in the transport stream based on the user interaction intent determined from the input data and application contextual data. In some examples, the machine learning model controller circuitry 308 trains the interactive context machine learning model using training data (e.g., HID inputs, OS events, and application contextual data and corresponding, known user interactions). During the training, the machine learning model controller circuitry 308 determines a plurality of weights corresponding to the application contextual data. For example, the type of application (e.g., Microsoft® PowerPoint versus Microsoft® Word) may be weighted differently in determining the user interaction intentions for the HID inputs. For example, an HID input of pressing the down arrow on a keyboard would not significantly change the content rendered in a Microsoft® Word application, but the same pressing of the down arrow while using Microsoft® PowerPoint would cause a significant change in the content rendered (e.g., changing to a different slide with each press). The example machine learning model controller circuitry 308 determines a set of weights for application contextual data when processing the input data with the interactive context machine learning model. Further details regarding the interactive context machine learning model are described below in conjunction with FIG. 5.

In the illustrated example of FIG. 3, the machine learning model controller circuitry 308 processes the input data and the application contextual data using a machine learning model (e.g., the interactive context machine learning model). However, the example machine learning model controller circuitry 308 can process the input data and the application contextual data based on heuristics, rules, policies, etc.

In some examples, the interactive context frame selection circuitry 206 includes means for processing input data and application contextual data with a machine learning model. For example, the means for processing may be implemented by machine learning model controller circuitry 308. In some examples, the machine learning model controller circuitry 308 may be instantiated by processor circuitry such as the example processor circuitry 1212 of FIG. 12. For instance, the machine learning model controller circuitry 308 may be instantiated by the example general purpose processor circuitry 1300 of FIG. 13 executing machine executable instructions such as that implemented by at least block 1108 of FIG. 11. In some examples, the machine learning model controller circuitry 308 may be instantiated by hardware logic circuitry, which may be implemented by an ASIC or the FPGA circuitry 1400 of FIG. 14 structured to perform operations corresponding to the machine readable instructions. Additionally or alternatively, the machine learning model controller circuitry 308 may be instantiated by any other combination of hardware, software, and/or firmware. For example, the machine learning model controller circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the interactive context frame selection circuitry 206 includes example interaction determination circuitry 310 to determine the interaction classification from the interactive context machine learning model. The example interaction determination circuitry 310 determines the interaction classification for the classification interval based on the output of the interactive context machine learning model from the machine learning model controller circuitry 308. In examples disclosed herein, the interaction classification is used to classify whether a transition/change in content being rendered in the screen sharing event is intended (e.g., relevant) or not intended (e.g., irrelevant) for the screen sharing event during the classification interval. In some examples, the interaction classification is a binary value (e.g., 0 or 1, yes or no, etc.). In some examples, the interaction classification can be one of a first value or a second value, where the first value represents a corresponding video frame is intended and the second value represents the video frame is not intended (e.g., yes or no, 0 or 1, etc.). In some examples, in response to the machine learning model controller circuitry 308 not detecting/identifying any screen sharing content changes in the video frame data, the interaction determination circuitry 310 determines the interaction classification as "intended" for the video frames generated during the screen sharing event. In some examples, the interaction determination circuitry 310 determines an interaction classification for a content change event to be "not intended" or an equivalent classification when the associated transition/change in the content being rendered during the classification interval is not relevant to share to other users in a video conferencing meeting. For example, if the input data and application contextual data indicates a Microsoft® Word application is being shared during a screen sharing event and a transition/change of scrolling down a plurality of pages is identified, the example interaction determination circuitry 310 determines an interaction classification of "not intended" for the video frames generated during that classification interval based on the interactive context machine learning model. In another example, if the input data and application contextual data indicates a fast changing content application is being shared (e.g., a video player, camera content, etc.) during the screen sharing event and no transition is identified (e.g., no user interaction from the HID input), the example interaction determination circuitry 310 determines an interaction classification of "intended" for those video frames generated during the screen sharing event. Further examples of scenarios of determining the interaction classification are described in further detail below in conjunction with FIGS. 7 and 9.

In some examples, the interactive context frame selection circuitry 206 includes for determining an interaction classification. For example, the means for determining may be implemented by interaction determination circuitry 310. In some examples, the interaction determination circuitry 310 may be instantiated by processor circuitry such as the example processor circuitry 1212 of FIG. 12. For instance, the interaction determination circuitry 310 may be instantiated by the example general purpose processor circuitry 1300 of FIG. 13 executing machine executable instructions such as that implemented by at least block 1110 of FIG. 11. In some examples, the interaction determination circuitry 310 may be instantiated by hardware logic circuitry, which may be implemented by an ASIC or the FPGA circuitry 1400 of FIG. 14 structured to perform operations corresponding to the machine readable instructions. Additionally or alternatively, the interaction determination circuitry 310 may be instantiated by any other combination of hardware, software, and/or firmware. For example, the interaction determination circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The interactive context frame selection circuitry 206 of FIG. 3 includes example frame selection circuitry 312 to select video frames based on the interaction classification determined by the example interaction determination circuitry 310. In some examples, the frame selection circuitry 312 identifies video frames from the screen sharing event determined to correspond to the classification interval associated with the interaction classification. The example frame selection circuitry 312 identifies the video frames generated during the classification interval that is associated with the interaction classification. The example frame selection circuitry 312 determines whether to remove/exclude the identified video frames from a transport stream for the video conferencing meeting based on the interaction classification. For example, in response to the interaction classification having a first value indicating/representing the transition in the content is not intended for the screen sharing event, the frame selection circuitry 312 identifies the video frames from the screen sharing event that correspond to the interaction classification by identifying the video frames generated during the time period (e.g., classification interval) associated with the data of the interaction classification. In some examples, the frame selection circuitry 312 removes/excludes the identified video frames, and the remaining generated video frames from the screen sharing event are included in the transport stream for the video conferencing meeting. In some examples, the frame selection circuitry 312 removes/excludes the video frames (image frames) from the video data of the video conferencing meeting and the corresponding audio data is included in the transport stream. In some examples, the identified video frames are treated as a pause such that the last video frame transmitted in the transport stream prior to the classification interval is repeated to avoid a video transition at the start of the classification interval. In other examples, the identified video frames are treated as blank video frames during the classification interval.

In some examples, the frame selection circuitry 312 does not remove video frames associated with the classification interval from the transport stream if the interaction classification for that classification interval indicates the transition in the content was intended for the screen sharing event. The example frame selection circuitry 312 transmits/provides the selected/remaining video frames for the screen sharing event to the example video encoder circuitry 208 of FIG. 2 to encode the remaining video frames before the transport stream is generated.

In some examples, the interactive context frame selection circuitry 206 includes means for selecting video frames. For example, the means for selecting may be implemented by frame selection circuitry 312. In some examples, the frame selection circuitry 312 may be instantiated by processor circuitry such as the example processor circuitry 1212 of FIG. 12. For instance, the frame selection circuitry 312 may be instantiated by the example general purpose processor circuitry 1300 of FIG. 13 executing machine executable instructions such as that implemented by at least blocks 1112, 1114 of FIG. 11. In some examples, the frame selection circuitry 312 may be instantiated by hardware logic circuitry, which may be implemented by an ASIC or the FPGA circuitry 1400 of FIG. 14 structured to perform operations corresponding to the machine readable instructions. Additionally or alternatively, the frame selection circuitry 312 may be instantiated by any other combination of hardware, software, and/or firmware. For example, the frame selection circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
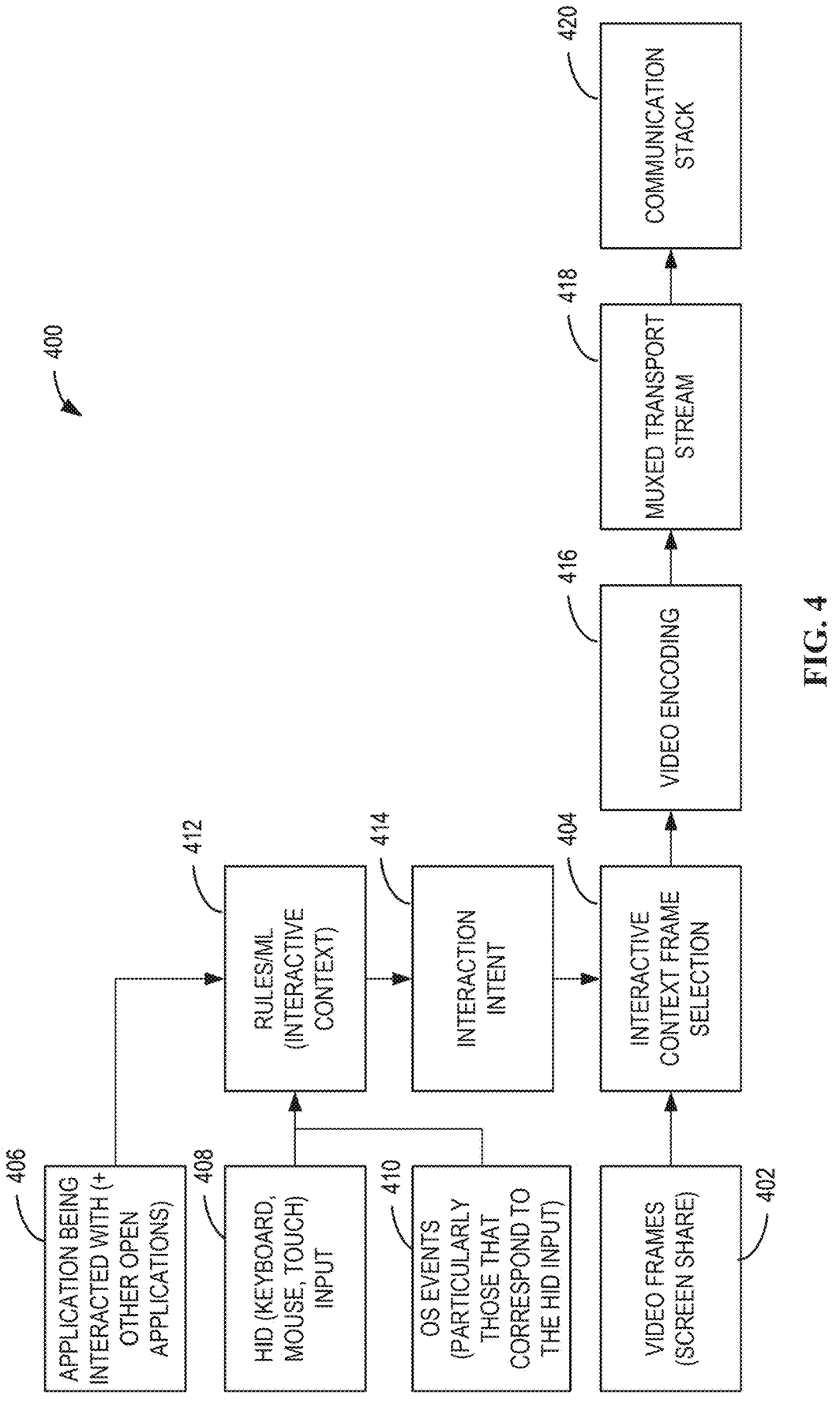
FIG. 4 illustrates an example of a process diagram of the video conferencing circuitry of FIG. 2 including the example interactive context frame selection circuitry of FIG. 3.

FIG. 4 illustrates an example of a process diagram 400 representative of example operation of the video conferencing circuitry 112 of FIG. 2, which includes the example interactive context frame selection circuitry 206 of FIG. 3. In the illustrated example, the process diagram 400 begins at block 402 at which video frames from a screen sharing event are generated by the example video frame generation circuitry 204 of FIG. 2. At block 404, the example interactive context frame selection circuitry 206 of FIGS. 2 and/or 3 performs interactive context frame selection on the generated video frames from block 402. In the example diagram 400, the interactive context frame selection of block 404 is performed using inputs from blocks 406-414. At block 406, the example application identification circuitry 302 of FIG. 3 identifies an application being interacted with and other open applications. At block 408, the example input determination circuitry 304 of FIG. 3 determines HID inputs. At block 410, the example OS event determination circuitry 306 of FIG. 3 determines OS events, particularly the OS events that correspond to the HID inputs determined at block 408. After blocks 406, 408, and 410, the data is input into block 412 at which the example machine learning model controller circuitry 308 of FIG. 3 applies the rules/machine learning model for interactive context on the data from blocks 406-410. At block 414, the example interaction determination circuitry 310 of FIG. 3 determines an interaction intent/classification based on the output from block 412. In the example process diagram 400, the output of block 414 (e.g., the interaction intent/classification) is input into block 404 to perform the interactive context frame selection. At block 416, the example video encoder circuitry 208 of FIG. 2 performs video encoding on the selected frames from block 404. At block 418, the example transport stream generation circuitry 210 of FIG. 2 generates a transport stream based on the encoded video frames from block 416. At block 420, the example communication circuitry 212 of FIG. 2 generates a communication stack to transmit the transport stream from block 418. After block 420, the example process diagram 400 ends.

Figure 5:
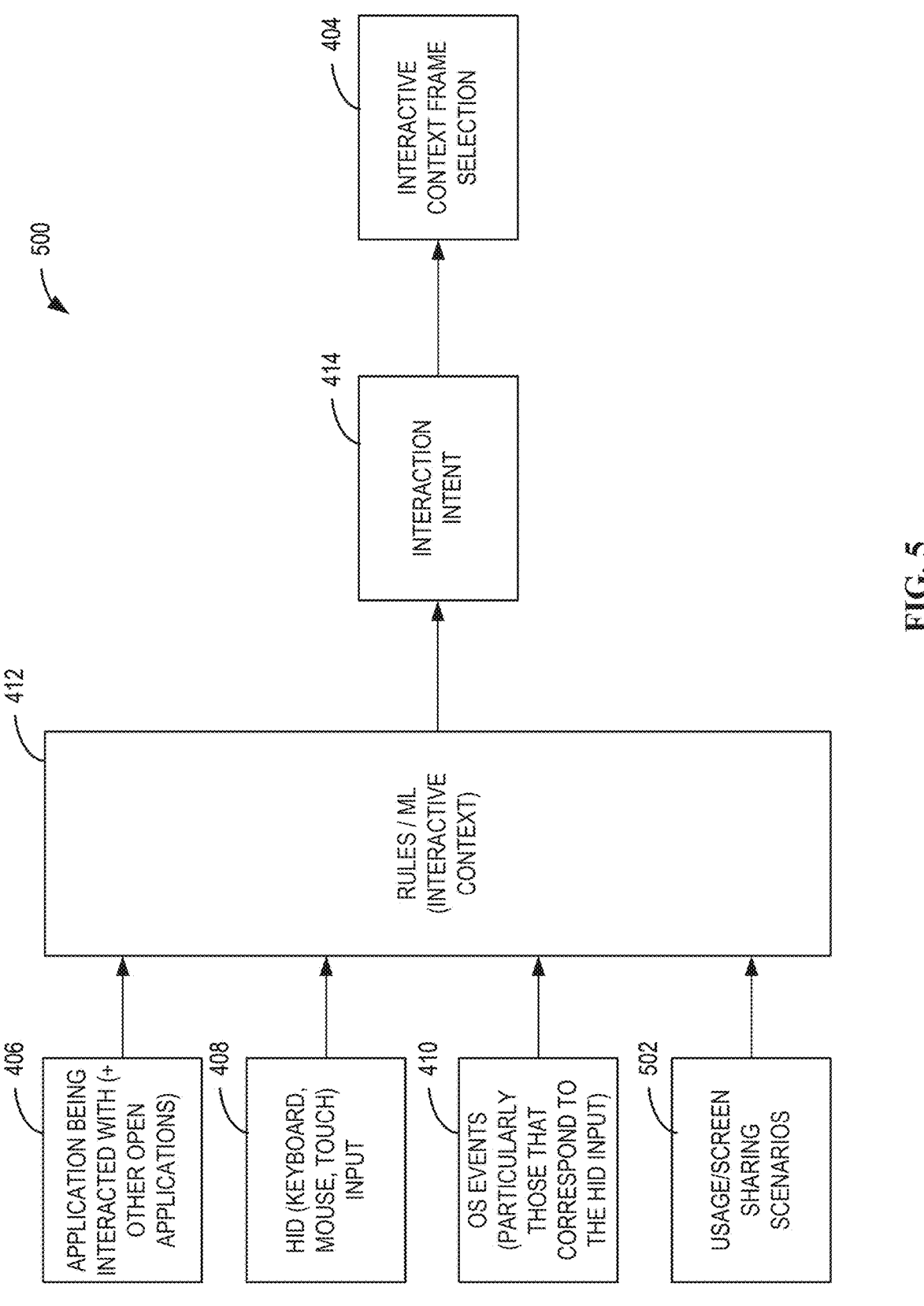
FIG. 5 illustrates an example of a process diagram of the machine learning model of the interactive context frame selection circuitry of FIG. 3.

FIG. 5 illustrates an example of a process diagram 500 of the machine learning model of the interactive context frame selection circuitry 206 of FIG. 3. The example process diagram 500 is illustrative of further details of the interactive context machine learning model run by the example machine learning model controller circuitry 308 of FIG. 3 in relation to the example process diagram 400 of FIG. 4. At block 406 in the illustrated example of FIG. 5, the example application identification circuitry 302 identifies the application contextual data (e.g., an application being interacted with and other open applications). In some examples, depending on the application being shared in the screen sharing event, certain input sequences may be more relevant than others in the example interactive context machine learning model run at block 412. For example, ten down arrow key presses moves a Microsoft® PowerPoint slide deck down 10 following slides resulting in unnecessary frames between the two slides (e.g., the beginning slide and the resulting end slide after the key presses). However, for a word processing application (e.g., Microsoft® Word), the ten down arrow key presses moves a cursor down 10 lines, which typically will not change the content on the screen unless the cursor is located at the bottom of the monitor screen. In such an example, the frames generated between these two cursor positions may still be required to be streamed in order to maintain readability of the word application. In the illustrated example of FIG. 5, the machine learning model controller circuitry 308 trains the interactive context machine learning model with weights to account for the application contextual data from block 406.

In the example process diagram 500, at block 408, the example input determination circuitry 304 determines HID inputs. In the illustrated example, at block 412, the machine learning model controller circuitry 308 treats the HID inputs from block 408 as time series data set where sequences and patterns of the different types of input are searched for by the interactive context machine learning model. In such examples, the time series data allows for identification of patterns of input as well as time between consecutive inputs (or a series of input) to be analyzed. In examples disclosed herein, the machine learning model controller circuitry 308 may use any algorithm for analyzing time series data. At block 410 of FIG. 5, the example OS event determination circuitry 306 determined OS events that correspond to the HID inputs determined at block 408.

In the illustrated example of FIG. 5, the process diagram 500 further includes an example block 502 at which the interactive context frame selection circuitry 206 also obtains usage/screen sharing scenarios. In some examples, the input determination circuitry 304 also determines screen sharing data. For example, desktop streaming/sharing scenarios and single application streaming/sharing scenarios can affect weights applied to the application contextual data in the interactive context machine learning model. After blocks 406, 408, 410, and 502, the data is input into block 412 at which the example machine learning model controller circuitry 308 of FIG. 3 applies the rules/machine learning model for interactive context on the data from blocks 406-502. The example machine learning model controller circuitry 308 processes the input data and the application contextual data with the interactive context machine learning model to determine an interaction classification for the screen sharing event of the video conferencing meeting during the classification interval. In the example process diagram 500, the output of block 414 (e.g., the interaction intent/classification) is input into block 404 to perform the interactive context frame selection.

Figure 6:
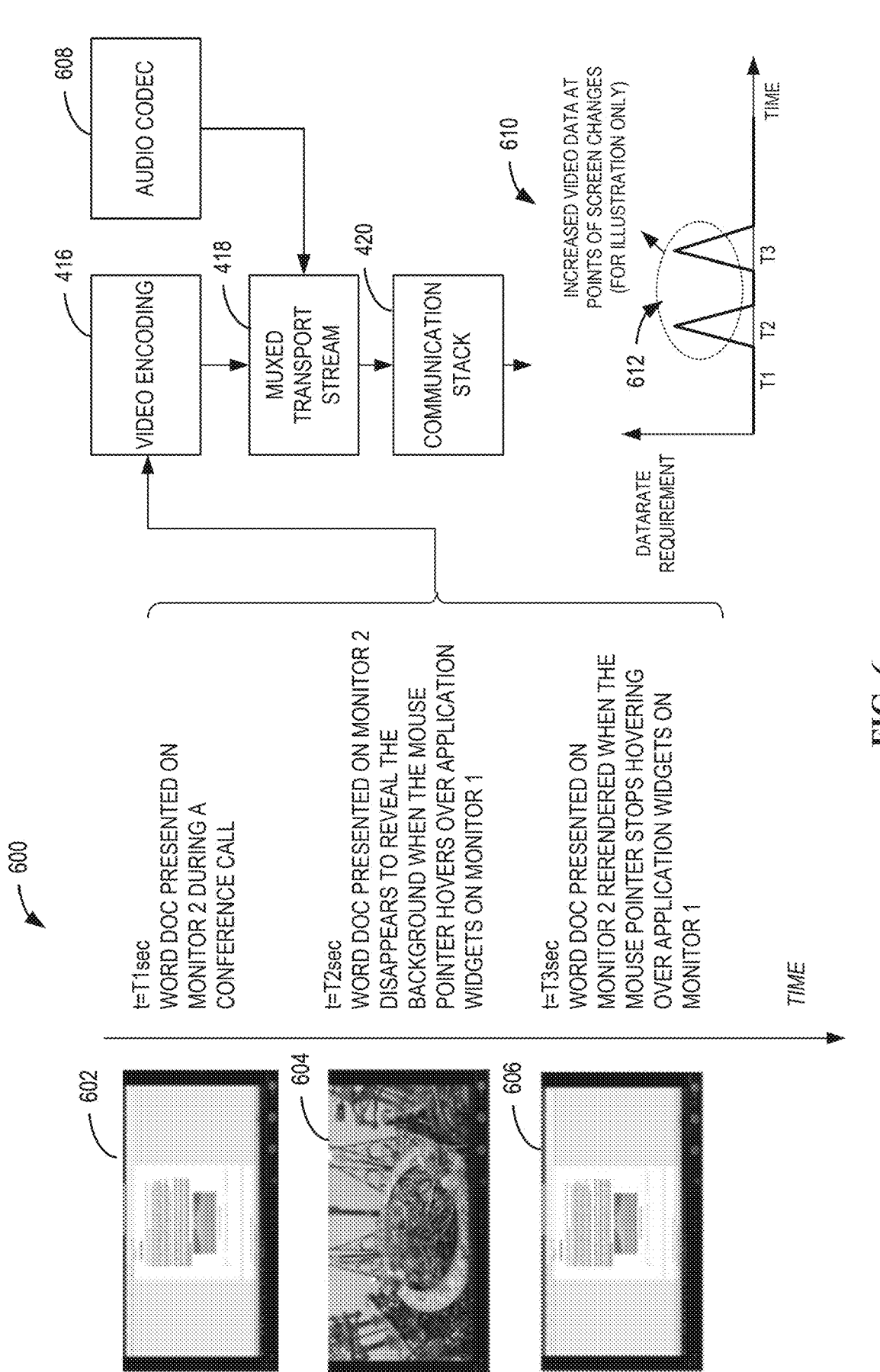
FIG. 6 is a schematic of an example screen sharing scenario of moving through different sections of a document for a period of time without using the example interactive context frame selection circuitry of FIG. 3.

FIG. 6 is a schematic of an example screen sharing scenario 600 of moving through different sections of a document for a period of time without using the example interactive context frame selection circuitry 206 of FIG. 3. The example screen sharing scenario 600 of FIG. 6 includes an example first video frame 602 at a time of T1 seconds during the screen sharing event. In the illustrated example of FIG. 6, the first video frame 602 illustrates a word processing document that is presented on a second monitor during a video conferencing meeting. The example screen sharing scenario 600 further includes an example second video frame 604 at a time of T2 seconds during the screen sharing event. The example second video frame 604 illustrates when the word processing document disappears on the second monitor screen to reveal the background of the second monitor screen when the mouse pointer is moved by the user to hover over application widgets on a first monitor screen (not visible in the screen sharing event). The example screen sharing scenario 600 includes an example third video frame 606 at a time of T3 seconds during the screen sharing event. The example third video frame 606 illustrates when the word processing document on the second monitor screen is re-rendered when the mouse pointer is removed from hovering over application widgets on the first monitor screen and none of those application widgets were selected/clicked on. The example screen sharing scenario 600 illustrates an unnecessary transition between the word processing document to the background screen of the second monitor and back to the word processing document during a screen sharing event of a video conferencing meeting. In the illustrated example, the example interactive context frame selection circuitry 206 is not present so interactive context frame selection is not performed, and at block 416, the example video encoder circuitry 208 encodes all of the video frames (e.g., the first video frame 602, the second video frame 604, and the third video frame 606). At block 418, the example transport stream generation circuitry 210 multiplexes the encoded video frames from block 416 with audio data from an audio codec of example block 608 to generate a transport stream. At block 420, the example communication circuitry 212 generates a communication stack to transmit the transport stream from block 418 with the data from all of the example video frames of the screen sharing scenario 600.

An example graph 610 of FIG. 6 illustrates the data rate requirement of the network over the period of time of the screen sharing scenario (e.g., from T1 to T3). In the illustrated example of graph 610, there are two peaks 612 of video data spikes that are streamed over the network. In the illustrated example, the two peaks 612 results from the encoded video data from the transitions between the content rendered in the second video frame 604 and the third video frame 606. The example two peaks illustrate the large amount of information that needs to be encoded over a short duration of a few video frames, which causes the spikes in bandwidth requirements over the network.

Figure 7:
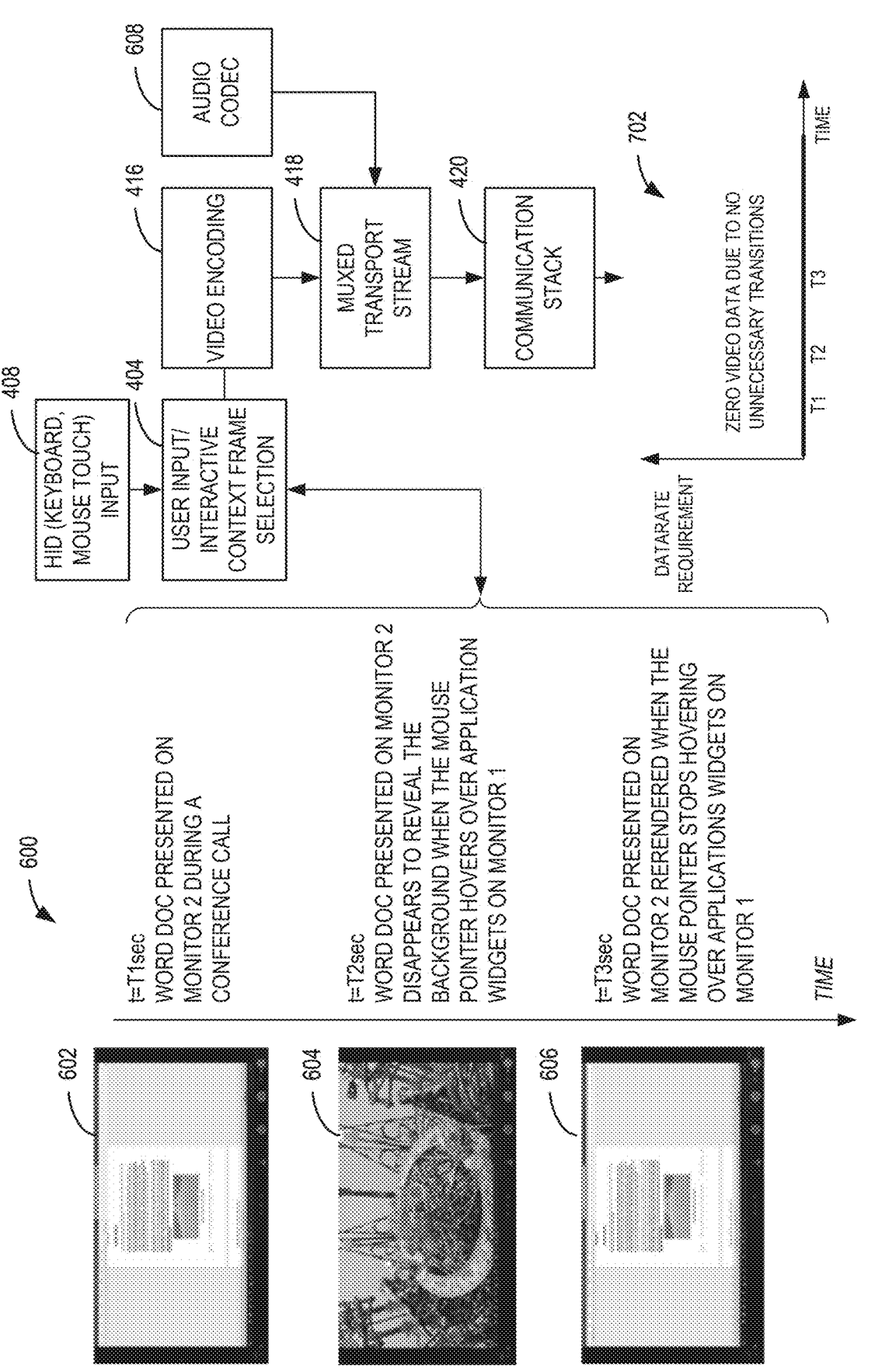
FIG. 7 is a schematic of the example screen sharing scenario of FIG. 6 using the example interactive context frame selection circuitry of FIG. 3.

FIG. 7 is a schematic of the example screen sharing scenario 600 of FIG. 6 using the example interactive context frame selection circuitry 206 of FIG. 3. As described above in connection with FIG. 6, the example screen sharing scenario 600 illustrates an unnecessary transition between the word processing document to the background screen of the second monitor and back to the word processing document during a screen sharing event of a video conferencing meeting (e.g., illustrated in the example first video frame 602, the example second video frame 604, and the example third video frame 606). In the illustrated example of FIG. 7, the example interactive context frame selection circuitry 206 performs the interactive context frame selection of block 404. In the illustrated example the screen sharing context is determined by the example interactive context frame selection circuitry 206 as there being two monitors, where the screen sharing event is on the second monitor. The example application identification circuitry 302 of FIG. 3 determines the application contextual data as an active word processing application on the second monitor screen, and that there are other applications open and minimized with active widgets on the taskbar of the first monitor screen. In the illustrated example, the example input determination circuitry 304 also identifies a time series of user input over T1 through T3 of the screen sharing scenario 600. For example, at block 408, the example input determination circuitry 304 may determine the time series data of user input from HID devices as: 1) pointer cursor on the second monitor screen interacting with word content at T1, 2) pointer moves to first monitor screen, 3) pointer hovers over widgets on task bar of the first monitor screen at T2 (e.g., due to haphazard, searching, moving around, etc.), and 4) pointer moves away from widgets into the first monitor screen or the second monitor screen at T3. In the illustrated example, the example machine learning model controller circuitry 308 of FIG. 3 processes the time series data of the user input and the application contextual data to determine the interaction classification. The example machine learning model controller circuitry 308 identifies a change in the screen sharing content at the second video frame 604 at T2 and initializes the classification interval. In the illustrated example of FIG. 7, the example interaction determination circuitry 310 determines the interaction classification for the example second video frame 604 during the classification interval (e.g., from T2 to T3) is that it is not intended for the screen sharing event of the example screen sharing scenario 600. In such examples, the example frame selection circuitry 312 removes the example second video frame 604. At block 416, the example the example video encoder circuitry 208 encodes only the example first video frame 602 and the example third video frame 606. At block 418, the example transport stream generation circuitry 210 multiplexes the encoded video frames from block 416 with audio data from an audio codec of example block 608 to generate a transport stream. At block 420, the example communication circuitry 212 generates a communication stack to transmit the transport stream from block 418 with only the data from the example first video frame 602 and the example third video frame 606.

An example graph 702 of FIG. 7 illustrates the data rate requirement of the network over the period of time of the screen sharing scenario (e.g., from T1 to T3) using the interactive context frame selection circuitry 206. The example graph 702 illustrates that there are no video data spikes during the screen sharing scenario from the encoded video data streamed over the network (e.g., because the example second video frame 604 is removed from the transport stream). In the illustrated example of FIG. 7, the interactive context frame selection circuitry 206 analyzes user input and interactive context to identify unnecessary frames that are being presented (e.g., by applying rules/ machine learning model) and remove the unnecessary frame from the transport stream to reduce unnecessary spikes in video traffic on the network, as seen in the comparison of the example graph 610 and the example graph 702.

In some examples, a user may intend to display the background of the second monitor screen in the example screen sharing scenario 600. In such examples, examples disclosed herein can set appropriate timeouts to begin sending background frames. Additionally, the user input characteristics of a pointer hovering can also be used to characterize intent for the screen sharing event. In examples disclosed herein, if movement is intended, the user input characteristic will be definite and stable during the hover compared to haphazard or searching movements when unintended (e.g., illustrated in the example screen sharing scenario of FIG. 6). For example, the time series data of user input from HID devices may be determined to be: 1) pointer cursor on the second monitor screen interacting with work content, 2) pointer moves to a first monitor screen, 3) pointer hovers over widgets on task bar (definite and stable), and 4) pointer moves away from widgets onto the first monitor screen or the second monitor screen. In such examples, the video frames during the "hover" would not be removed from the transport stream.

Figure 8:
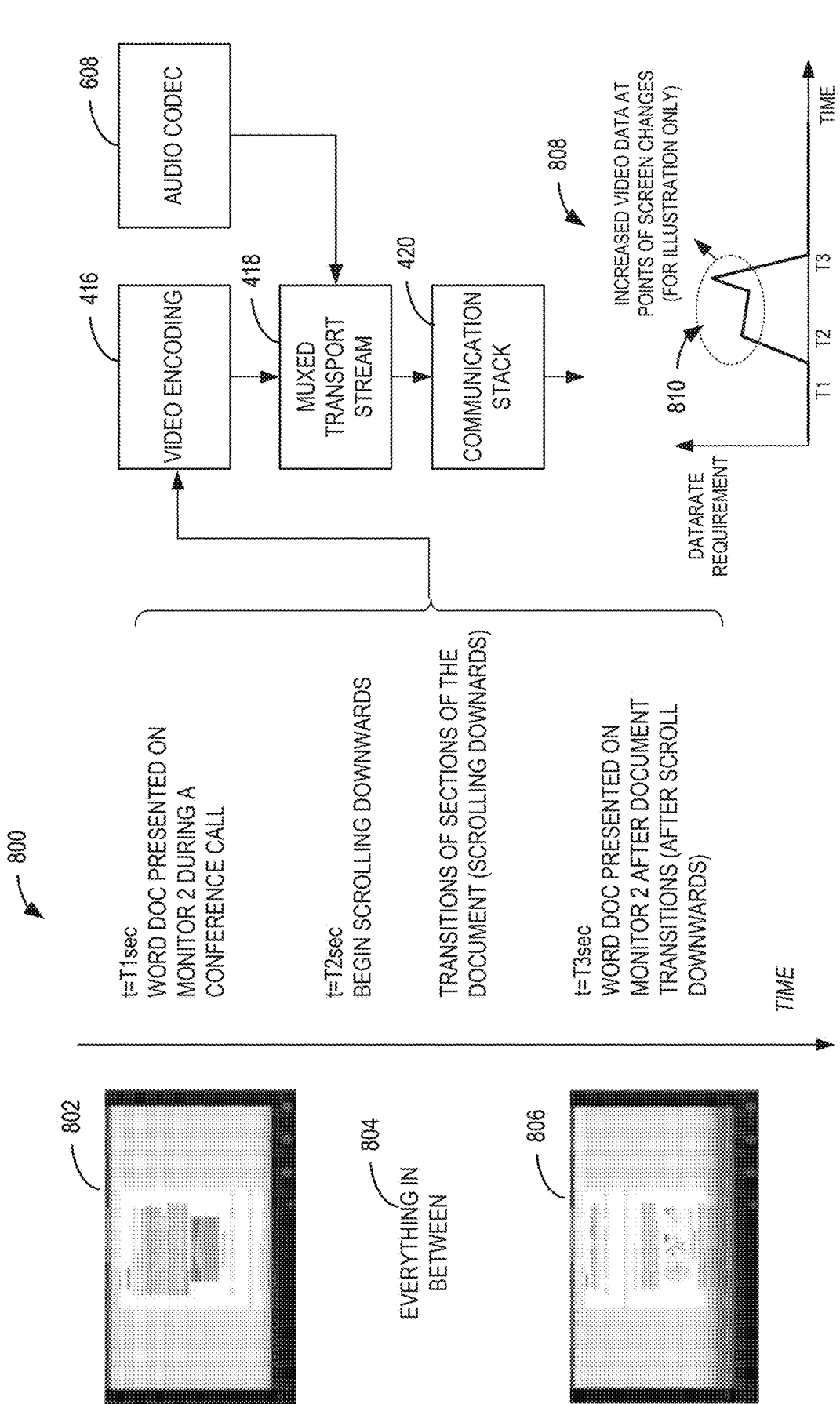
FIG. 8 is a schematic of an example screen sharing scenario of minimizing a document for a period of time without using the example interactive context frame selection circuitry of FIG. 3.

FIG. 8 is a schematic of an example screen sharing scenario 800 of minimizing a document for a period of time without using the example interactive context frame selection circuitry 206 of FIG. 3. The example screen sharing scenario 800 of FIG. 8 includes an example first video frame 802 at a time of T1 seconds during the screen sharing event. In the illustrated example of FIG. 8, the first video frame 802 illustrates a word processing document that is presented on a second monitor during a video conferencing meeting. The example screen sharing scenario 800 further includes an example plurality of video frames 804 at a time of T2 seconds during the screen sharing event. The example plurality of video frame 804 illustrate when a user begins scrolling downward in the word processing documents and transitions between sections of the document (not visible in the screen sharing event). The example screen sharing scenario 800 includes an example third video frame 806 at a time T3 seconds during the screen sharing event. The example third video frame 806 illustrates the word processing document that is presented on the second monitor screen after the document has transitioned to a different section (from the scrolling downwards). The example screen sharing scenario 800 illustrates an unnecessary transition between two sections of the word processing document via a downward scrolling action (e.g., transitioning between two stable presentation locations in the word processing document).

In the illustrated example, the example interactive context frame selection circuitry 206 is not present so interactive context frame selection is not performed, and at block 416, the example video encoder circuitry 208 encodes all of the video frames (e.g., the first video frame 802, the plurality of video frames 804, and the third video frame 806). At block 418, the example transport stream generation circuitry 210 multiplexes the encoded video frames from block 416 with audio data from an audio codec of the block 608 to generate a transport stream. At block 420, the example communication circuitry 212 generates a communication stack to transmit the transport stream from block 418 with the data from all of the example video frames of the screen sharing scenario 800.

An example graph 808 of FIG. 8 illustrates the data rate requirement of the network over the period of time of the screen sharing scenario (e.g., from T1 to T3). In the illustrated example of graph 808, there are peaks 810 of video data spikes that are streamed over the network. In the illustrated example, the peaks 810 results from the encoded video data from the transitions (e.g., at the plurality of video frames 804) between the content rendered in the two stable presentation locations of the first video frame 802 and the third video frame 806. The example peaks illustrate the large amount of information that needs to be encoded over a short duration of a few video frames (e.g., the plurality of video frames 804), which causes the spikes in bandwidth requirements over the network.

Figure 9:
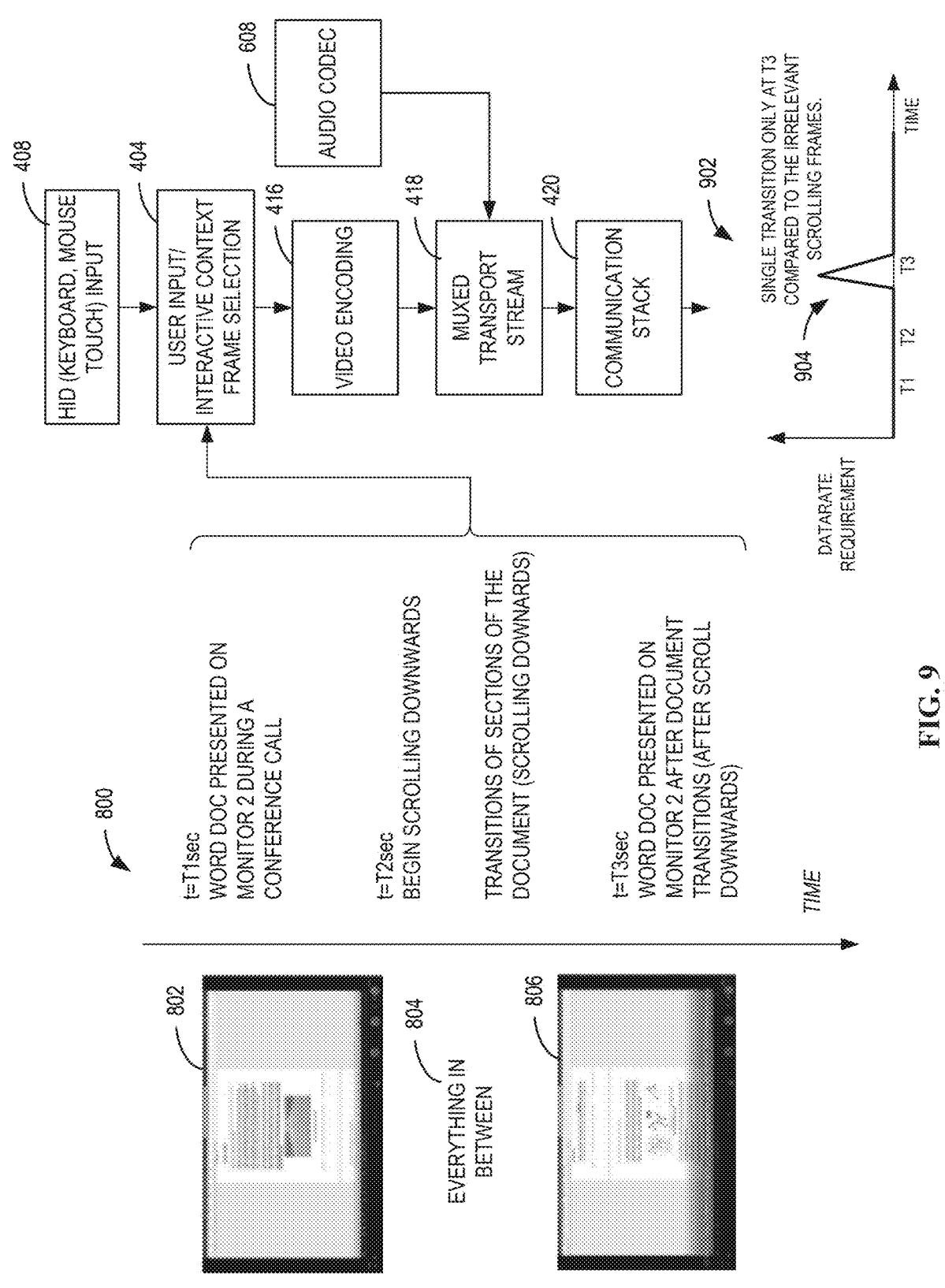
FIG. 9 is a schematic of an example screen sharing scenario of FIG. 8 using the example interactive context frame selection circuitry of FIG. 3.

FIG. 9 is a schematic of the example screen sharing scenario 800 of FIG. 8 using the example interactive context frame selection circuitry 206 of FIG. 3. As described above in connection with FIG. 8, the example screen sharing scenario 800 illustrates an unnecessary transition between two sections of the word processing document via a downward scrolling action (e.g., transitioning between two stable presentation locations in the word processing document), as illustrated in the example first video frame 802, the example plurality of video frames 804, and the example third video frame 806. In the illustrated example of FIG. 9, the example interactive context frame selection circuitry 206 performs the interactive context frame selection of block 404. In the illustrated example the screen sharing context is determined by the example interactive context frame selection circuitry 206 as there being two monitors, where the screen sharing event is on the second monitor. The example application identification circuitry 302 of FIG. 3 determines the application contextual data as an active word processing application on the second monitor screen, and that there are other application open and minimized with active widgets on the taskbar of the first monitor screen. In the illustrated example, the example input determination circuitry 304 also identifies a time series of user input over T1 through T3 of the screen sharing scenario 800. For example, at block 408, the example input determination circuitry 304 may determine the time series data of user input from HID devices as: 1) pointer cursor on the second monitor screen interacting with word content at T1, 2) pointer uses scroll bar on the word processing document to scroll by an amount of pixel per second, 3) pointer stops scrolling on the second monitor screen at T3. In the illustrated example, the example machine learning model controller circuitry 308 of FIG. 3 processes the timer series data of the user input and the application contextual data to determine the interaction classification during the classification interval. The example machine learning model controller circuitry 308 identifies a change in the screen sharing content at the plurality of video frames 804 at T2 and initializes the classification interval. In the illustrated example of FIG. 9, the example interaction determination circuitry 310 determines the interaction classification for the example plurality of video frames 804 during the classification interval is that it is not intended for the screen sharing event of the example screen sharing scenario 800. In such examples, the example frame selection circuitry 312 removes/excludes the example plurality of video frames 804. At block 416, the example the example video encoder circuitry 208 encodes only the example first video frame 802 and the example third video frame 806. At block 418, the example transport stream generation circuitry 210 multiplexes the encoded video frames from block 416 with audio data from an audio codec of block 608 to generate a transport stream. At block 420, the example communication circuitry 212 generates a communication stack to transmit the transport stream from block 418 with only the data from the example first video frame 802 and the example third video frame 806.

An example graph 902 of FIG. 9 illustrates the data rate requirement of the network over the period of time of the screen sharing scenario (e.g., from T1 to T3) using the interactive context frame selection circuitry 206. The example graph 902 illustrates that there is one example video data spike 904 during the screen sharing scenario from the encoded video data streamed over the network due to the transition in content rendered from the example first video frame 802 and the example third video frame 806 (e.g., from the downward scrolling transition). In the illustrated example of FIG. 9, the interactive context frame selection circuitry 206 analyzes user input and interactive context to identify unnecessary frames that are being presented (e.g., by applying rules/machine learning model) and removes the unnecessary frame from the transport stream to reduce unnecessary spikes in video traffic on the network to only those from intended transitions in the content rendered (e.g., from the first video frame 802 and the third video frame 806), as seen in the comparison of the example graph 808 and the example graph 902.

While an example manner of implementing the video conferencing circuitry 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example user interface 202, the example video frame generation circuitry 204, the example interactive context frame selection circuitry 206, the example video encoder circuitry 208, the example transport stream generation circuitry 210, the example communication circuitry 212, and/or, more generally, the example video conferencing circuitry 112 of FIG. 1, may be implemented by hardware alone or by hardware in combination with software and/or firmware. Thus, for example, any of the example video conferencing circuitry 112 and/or, more generally, the example video conferencing circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example video conferencing circuitry 112 of FIG. 1 may include one or more elements, processes, and/or devices in addition to, or instead of, those illustrated in FIG. 2, and/or may include more than one of any or all of the illustrated elements, processes and devices.

While an example manner of implementing the interactive context frame selection circuitry 206 of FIG. 2 is illustrated in FIG. 3, one or more of the elements, processes, and/or devices illustrated in FIG. 3 may be combined, divided, re-arranged, omitted, eliminated, and/or implemented in any other way. Further, the example application identification circuitry 302, the example input determination circuitry 304, the example OS event determination circuitry 306, the example machine learning model controller circuitry 308, the example interaction determination circuitry 310, the example frame selection circuitry 312, and/or, more generally, the example interactive context frame selection circuitry 206 of FIG. 2, may be implemented by hardware alone or by hardware in combination with software and/or firmware. Thus, for example, any of the example application identification circuitry 302, the example input determination circuitry 304, the example OS event determination circuitry 306, the example machine learning model controller circuitry 308, the example interaction determination circuitry 310, the example frame selection circuitry 312, and/or, more generally, the example interactive context frame selection circuitry 206, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example interactive context frame selection circuitry 206 of FIG. 2 may include one or more elements, processes, and/or devices in addition to, or instead of, those illustrated in FIG. 3, and/or may include more than one of any or all of the illustrated elements, processes and devices.

Figure 10:
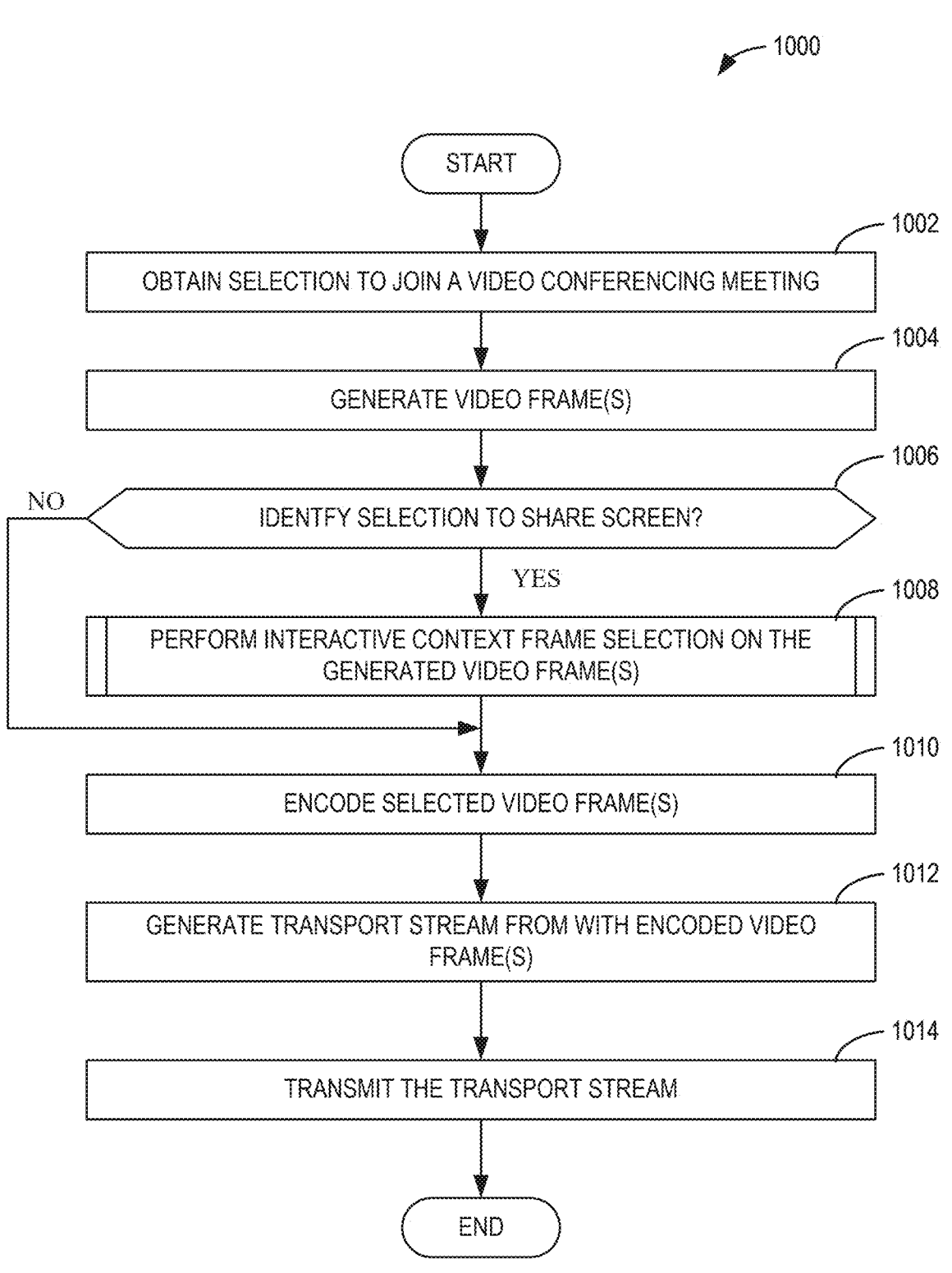
FIG. 10 is a flowchart representative of example machine readable instructions and/or example operations that may be executed by example processor circuitry to implement the video conferencing circuitry of FIGS. 1 and/or 2.
Figure 11:
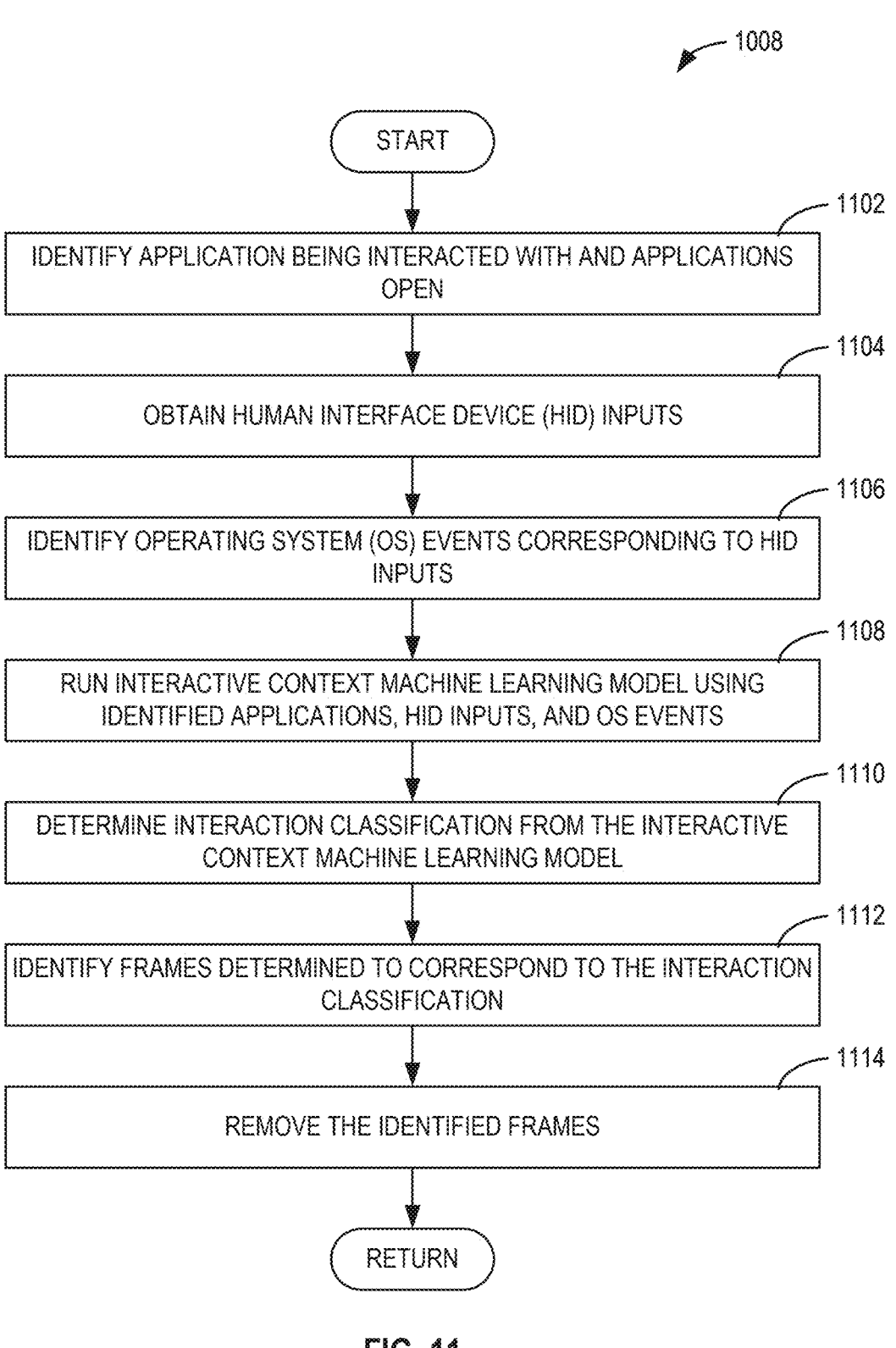
FIG. 11 is a flowchart representative of example machine readable instructions and/or example operations that may be executed by example processor circuitry to implement the of example interactive context frame selection circuitry of FIGS. 2 and/or 3.

Flowcharts representative of example hardware logic circuitry, machine readable instructions/computer readable instructions, hardware implemented state machines, and/or any combination thereof for implementing the example video conferencing circuitry 112 of FIGS. 1 and/or 2 and the example interactive context frame selection circuitry 206 of FIGS. 2 and/or 3 are shown in FIGS. 10 and 11. The terms "machine readable instructions" and "computer readable instructions" are used interchangeably herein. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 10 and 11, many other methods of implementing the example video conferencing circuitry 112 of FIGS. 1 and/or 2 and the example interactive context frame selection circuitry 206 of FIGS. 2 and/or 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10 and 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 10 is a flowchart representative of example machine readable instructions and/or example operations 1000 that may be executed and/or instantiated by processor circuitry to implement the video conferencing circuitry 112 of FIGS. 1 and/or 2. The machine readable instructions and/or the operations 1000 of FIG. 10 begin at block 1002, at which the example user interface 202 obtains selection to join a video conferencing meeting. The example user interface 202 obtains user selection data related to a video conferencing meeting from a user. The user interface 202 obtains and analyzes inputs from the user of the user device 102 of FIG. 1 related to the video conferencing meeting via the display screen 104 and/or via one or more input devices (the input device(s) 106). In some examples, the user interface 202 obtains a selection from the user of the user device 102 to join or leave the video conferencing meeting. At block 1004, the example video frame generation circuitry 204 generates video frame(s). The video frame generation circuitry 204 obtains video inputs from the user device 102 (e.g., from an internal video camera) and/or one or more external devices (e.g., an external video camera attachment). The example video conferencing circuitry 112 generates the video frames from the video inputs to include in the transport stream of video and audio data for the video conferencing meeting.

At block 1006, the example user interface 202 identifies if there is a selection to share screen. In some examples, if the user interface 202 identifies/obtains a user selection to start screen sharing, the user interface 202 notifies the interactive context frame selection circuitry 206 that a screen sharing event has begun and to process the data associated with the video content being shared. If the example user interface 202 identifies there is a selection to share screen, then process 1000 continues to block 1008 at which the example interactive context frame selection circuitry 206 performs interactive context frame selection on the generated video frame(s). The example interactive context frame selection circuitry 206 determines if there is a screen sharing event from the user interface 202. In some examples, the interactive context frame selection circuitry 206 determines interaction intent from user interactions with the content of the screen sharing event (obtained by the example user interface 202) to identify scenarios in which video frames can be dropped/removed from the transport stream to improve (e.g., optimize) video sharing/streaming during a video conferencing meeting. The example interactive context frame selection circuitry 206 obtains user inputs from the example user interface 202 to identify user interactions with the content of the screen sharing event. The example interactive context frame selection circuitry 206 obtains/analyzes application contextual data (e.g., application usage information, applications currently open on the user device 102, etc.) to determine the intent to show content during the screen sharing event based. The example interactive context frame selection circuitry 206 uses a sequence of user input, location on the screen, and time between each user input in combination with knowing the application (or applications) being interacted with, to predict intended usage during the screen sharing event. The interactive context frame selection circuitry 206 processes the user input and application contextual data (e.g., what application(s) are open and/or being interacted with) using a machine learning model to predict instances of screen sharing content changes and identify video frames that are not necessary to include in the transport stream to reduce (e.g., minimize) the spikes of streamed video data, which could cause degraded performance due to bandwidth constraints. The example interactive context frame selection circuitry 206 removes video frames from the transport stream that were identified as corresponding to instances of unnecessary transitions in the content based on the machine learning model. As described in further detail below, the example flowchart 1008 of FIG.

10 represents example instructions that may be implemented to perform interactive context frame selection on the generated video frame(s).

If the example user interface 202 identifies there is not a selection to share screen, then process 1000 continues to block 1010 at which the example video encoder circuitry 208 encodes the selected video frame(s). The example video encoder circuitry 208 performs encoding (e.g., image compression) on the video frames (e.g., the video frame generated by the example video frame generation circuitry 204 unless identified by the example interactive context frame selection circuitry 206 for removal) to convert the video frames to a digital format that reduces the size of the video frame before transmitting over the network (e.g., network 116 of FIG. 1). The example video encoder circuitry 208 encodes the video frames that were not removed by the example interactive context frame selection circuitry 206 and does not include the video frames that were removed by the interactive context frame selection circuitry 206 as corresponding to instances of unnecessary transitions in the content of the screen sharing event.

At block 1012, the example transport stream generation circuitry 210 generates a transport stream from the encoded video frame(s). The example transport stream generation circuitry 210 generates a transport stream (e.g., a standard digital container format for transmission and storage of audio data, video data, etc.) using the encoded video frames from the example video encoder circuitry 208. The example transport stream generation circuitry 210 combines audio data and video data (e.g., the encoded video frames) to generate the transport stream. For example, the transport stream generation circuitry 210 multiplexes the audio data and video data to generate the transport stream for the video conferencing meeting. At block 1014, the example communication circuitry 212 transmits the transport stream. The example communication circuitry 212 generates a communication stack for the transport stream of the video conferencing meeting. The example communication circuitry 212 transmits the communication stack to other user devices participating in the video conferencing meeting via the network (e.g., the network 116 of FIG. 1). After block 1014, program 1000 ends.

FIG. 11 is a flowchart representative of example machine readable instructions and/or example operations 1008 that may be executed and/or instantiated by processor circuitry to implement the interactive context frame selection circuitry 206 of FIGS. 2 and/or 3. The machine readable instructions and/or the operations 1008 of FIG. 11 begin at block 1102, at which the example application identification circuitry 302 identifies an application being interacted with and applications open. The example application identification circuitry 302 to obtain application contextual data in response to the start of (e.g., activation of, initiation of, etc.) a screen sharing event. The example application identification circuitry 302 obtains the application contextual data by identifying an application being interacted with during a screen sharing event and identifying any additional applications open on the user device 102. The example application identification circuitry 302 collects/obtains a sequence of application contextual data over a period of time (e.g., during the screen sharing event of the video conferencing meeting, until termination of the screen sharing event, etc.).

At block 1104, the example input determination circuitry 304 obtains human interface device (HID) inputs. The example input determination circuitry 304 obtains input data from a user (e.g., via the user interface 202 of FIG. 2) in response to a start of (e.g., activation of, initiation of, etc.)

a screen sharing event during a video conferencing meeting. In examples disclosed herein, the input data from the user includes HID inputs that are collected from HID devices (e.g., a mouse, a keyboard, a touchpad, etc.), such as the input device(s) 106 of FIG. 1. In some examples, the input data from the user can include screen scrolling, user clicks/selections on a screen, etc. The example input determination circuitry 304 collects/obtains a sequence of input data from the user over a period of time (e.g., during the screen sharing event, until termination of the screen sharing event, etc.).

At block 1106, the example OS event determination circuitry 306 identifies OS events corresponding to the HID inputs. The example OS event determination circuitry 306 identifies OS events on the user device 102 that correspond to the HID inputs obtained by the example input determination circuitry 304. The example OS event determination circuitry 306 obtains the operating system events executed in response to the HID inputs collected by the user device 102. In some examples, the operating system events are included in the input data obtained by the example input determination circuitry 304.

At block 1108, the example machine learning model controller circuitry 308 runs an interactive context machine learning model using the identified applications, HID inputs, and OS events. The example machine learning model controller circuitry 308 runs the interactive context machine learning model using the input data (e.g., the HID inputs obtained by the input determination circuitry 304 and the OS events obtained by the OS event determination circuitry 306) and the identified application contextual data (e.g., if an application is being interacted with during a screen sharing event and if there are any additional applications open) obtained by the application identification circuitry 302. In some examples, the machine learning model controller circuitry 308 continuously runs the interactive context machine learning model to monitor available input data and application contextual data to identify screen sharing content changes in the video frame data (e.g., image frames from video data). In some examples, the machine learning model controller circuitry 308 processes the input data and application contextual data at a sampling rate (e.g., every second). In some examples, the machine learning model controller circuitry 308 processes the input data and application contextual data for screen sharing content changes in the video frame data and initializes a classification interval in response to identifying a screen sharing content change. In some examples, a classification interval is a period of time between different screen sharing content changes. In some examples, the machine learning model controller circuitry 308 terminates a classification interval after a designated period of time, when the machine learning model controller circuitry 308 does not detect a screen sharing content change, etc.

The example machine learning model controller circuitry 308 processes the input data and the application contextual data with the interactive context machine learning model to determine an interaction classification for the screen sharing event during the classification interval of the video conferencing meeting. In some examples, the machine learning model controller circuitry 308 processing a sequence of input data and a corresponding sequence of application contextual data obtained over a period of time (e.g., during the classification interval) using the interactive context machine learning model to identify patterns of input for the user interaction intent during the screen sharing event. The example machine learning model controller circuitry 308 predicts whether instances of screen sharing content changes in the video frame data during the classification interval should be included in the transport stream based on the user interaction intent determined from the input data and application contextual data. In some examples, the machine learning model controller circuitry 308 trains the interactive context machine learning model using training data (e.g., HID inputs, OS events, and application contextual data and corresponding, known user interactions). During the training, the machine learning model controller circuitry 308 determines a plurality of weights corresponding to the application contextual data. For example, the type of application (e.g., Microsoft® PowerPoint versus Microsoft® Word) may be weighted differently in determining the user interaction intentions for the HID inputs. For example, an HID input of pressing the down arrow on a keyboard would not significantly change the content rendered in a Microsoft® Word application, but the same pressing of the down arrow while using Microsoft® PowerPoint would cause a significant change in the content rendered (e.g., changing to a different slide with each press). The example machine learning model controller circuitry 308 determines a set of weights for application contextual data when processing the input data with the interactive context machine learning model.

At block 1110, the example interaction determination circuitry 310 determines the interaction classification from the interactive context machine learning model. The example interaction determination circuitry 310 determines the interaction classification for the screen sharing event based on the output of the interactive context machine learning model from the machine learning model controller circuitry 308. In examples disclosed herein, the interaction classification is used to classify whether a transition/change in content being rendered in the screen sharing event is intended (e.g., relevant) or not intended (e.g., irrelevant) for the screen sharing event during the classification interval. In some examples, the interaction classification is a binary value (e.g., 0 or 1, yes or no, etc.). In some examples, the interaction classification can be one of a first value or a second value, where the first value represents a corresponding video frame is intended and the second value represents the video frame is not intended (e.g., yes or no, 0 or 1, etc.). In some examples, in response to the machine learning model controller circuitry 308 not detecting/identifying any screen sharing content changes in the video frame data, the interaction determination circuitry 310 determines the interaction classification as "intended" for the video frames generated during the screen sharing event. In some examples, the interaction determination circuitry 310 determines an interaction classification for a content change event to be "not intended" or an equivalent classification when the associated transition/change in the content being rendered during the classification interval is not relevant to share to other users in a video conferencing meeting. For example, if the input data and application contextual data indicates a Microsoft® Word application is being shared during a screen sharing event and a transition of scrolling down a plurality of pages is identified, the example interaction determination circuitry 310 determines an interaction classification of "not intended" for the video frames generated during that classification interval based on the interactive context machine learning model. In another example, if the input data and application contextual data indicates a fast changing content application is being shared (e.g., a video player, camera content, etc.) during the screen sharing event and no transition is identified (e.g., no user interaction from the HID input), the example interaction determination circuitry 310 determines an interaction classification of "intended" for those video frames generated during the screen sharing event.

At block 1112, the example frame selection circuitry 312 identifies frames determined to correspond to the interaction classification. In some examples, the frame selection circuitry 312 identifies video frames from the screen sharing event determined to correspond to the classification interval associated with the interaction classification. The example frame selection circuitry 312 identifies the video frames generated during the classification interval that is associated with the interaction classification. The example frame selection circuitry 312 determines whether to remove/exclude the identified video frames from a transport stream for the video conferencing meeting based on the interaction classification. For example, in response to the interaction classification having a first value indicating/representing the transition in the content is not intended for the screen sharing event, the frame selection circuitry 312 identifies the video frames from the screen sharing event that correspond to the interaction classification by identifying the video frames generated during the time period (e.g., classification interval) associated with the data of the interaction classification.

At block 1114, the example frame selection circuitry 312 removes the identified frames. In some examples, the frame selection circuitry 312 removes the identified video frames, and only the remaining generated video frames from the screen sharing event are included in the transport stream for the video conferencing meeting. In some examples, the frame selection circuitry 312 removes/excludes the video frames (image frames) from the video data of the video conferencing meeting and the corresponding audio data is included in the transport stream. In some examples, the identified video frames are treated as a pause such that the last video frame transmitted in the transport stream prior to the classification interval is repeated to avoid a video transition at the start of the classification interval. In other examples, the identified video frames are treated as blank video frames during the classification interval. In some examples, the frame selection circuitry 312 does not remove any video frames from the transport stream if the interaction classification indicates the transition in the content was intended for the screen sharing event. The example frame selection circuitry 312 transmits the selected/remaining video frames for the screen sharing event to the example video encoder circuitry 208 of FIG. 2 to encode the selected/remaining video frames before the transport stream is generated. After block 1114, program 1008 ends and returns to program 1000 of FIG. 10.

Figure 12:
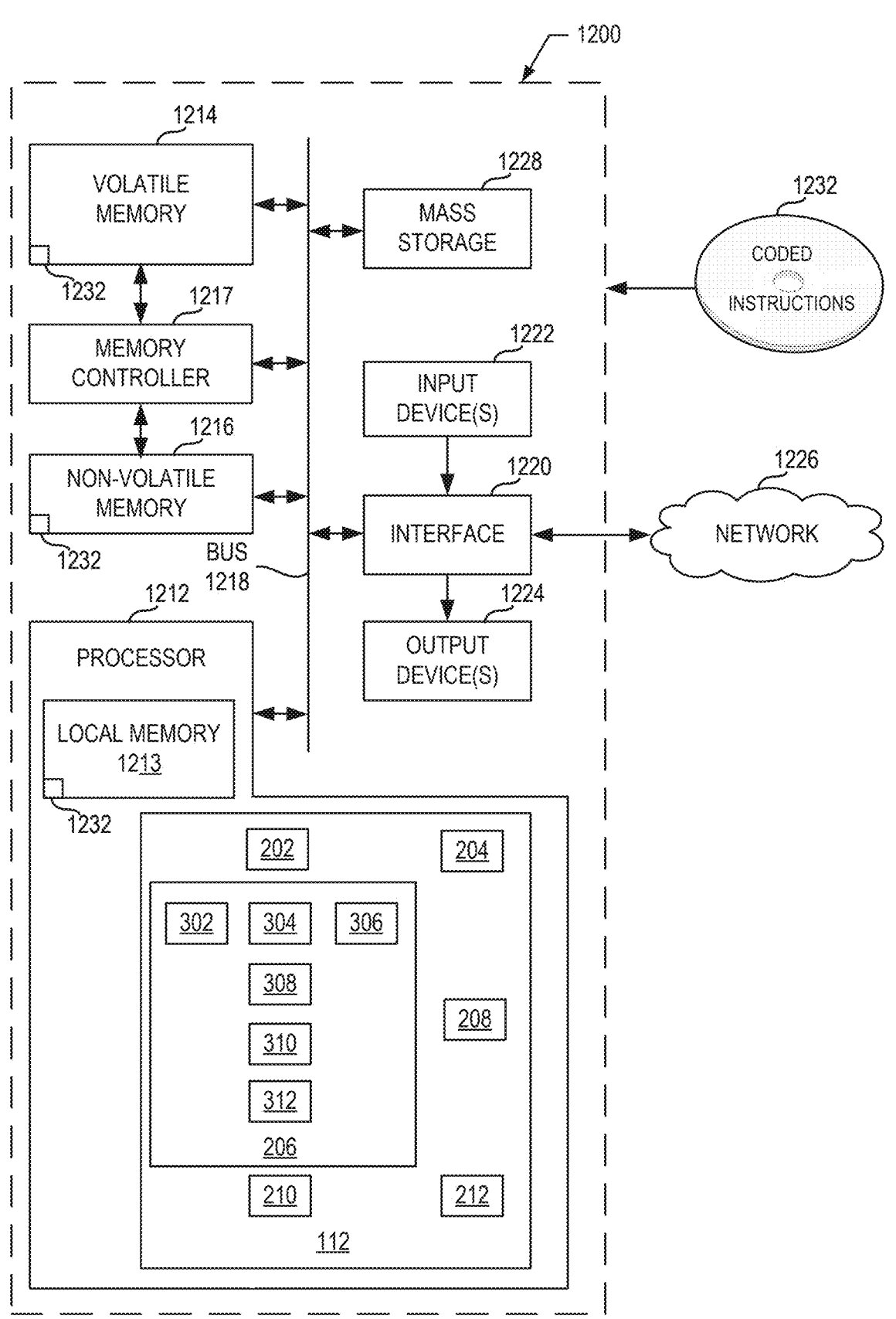
FIG. 12 is a block diagram of an example processing platform including processor circuitry structured to execute the example machine readable instructions and/or the example operations of FIGS. 10 and 11 to implement the video conferencing circuitry of FIGS. 1 and/or 2 and the interactive context frame selection circuitry of FIGS. 2 and/or 3.

FIG. 12 is a block diagram of an example processor platform 1200 structured to execute and/or instantiate the machine readable instructions and/or the operations of FIGS. 10 and 11 to implement the video conferencing circuitry 112 of FIGS. 1 and/or 2 and the interactive context frame selection circuitry 206 of FIGS. 2 and/or 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example user interface 202, the example video frame generation circuitry 204, the example interactive context frame selection circuitry 206, the example video encoder circuitry 208, the example transport stream generation circuitry 210, the example communication circuitry 212, the example application identification circuitry 302, the example input determination circuitry 304, the example OS event determination circuitry 306, the example machine learning model controller circuitry 308, the example interaction determination circuitry 310, and the example frame selection circuitry 312.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1232, which may be implemented by the machine readable instructions of FIGS. 10 and 11, may be stored in the mass storage device 1228, in the volatile memory 1214, in the non-volatile memory 1216, and/or on a removable non-transitory computer readable storage medium such as a CD or DVD.

Figure 13:
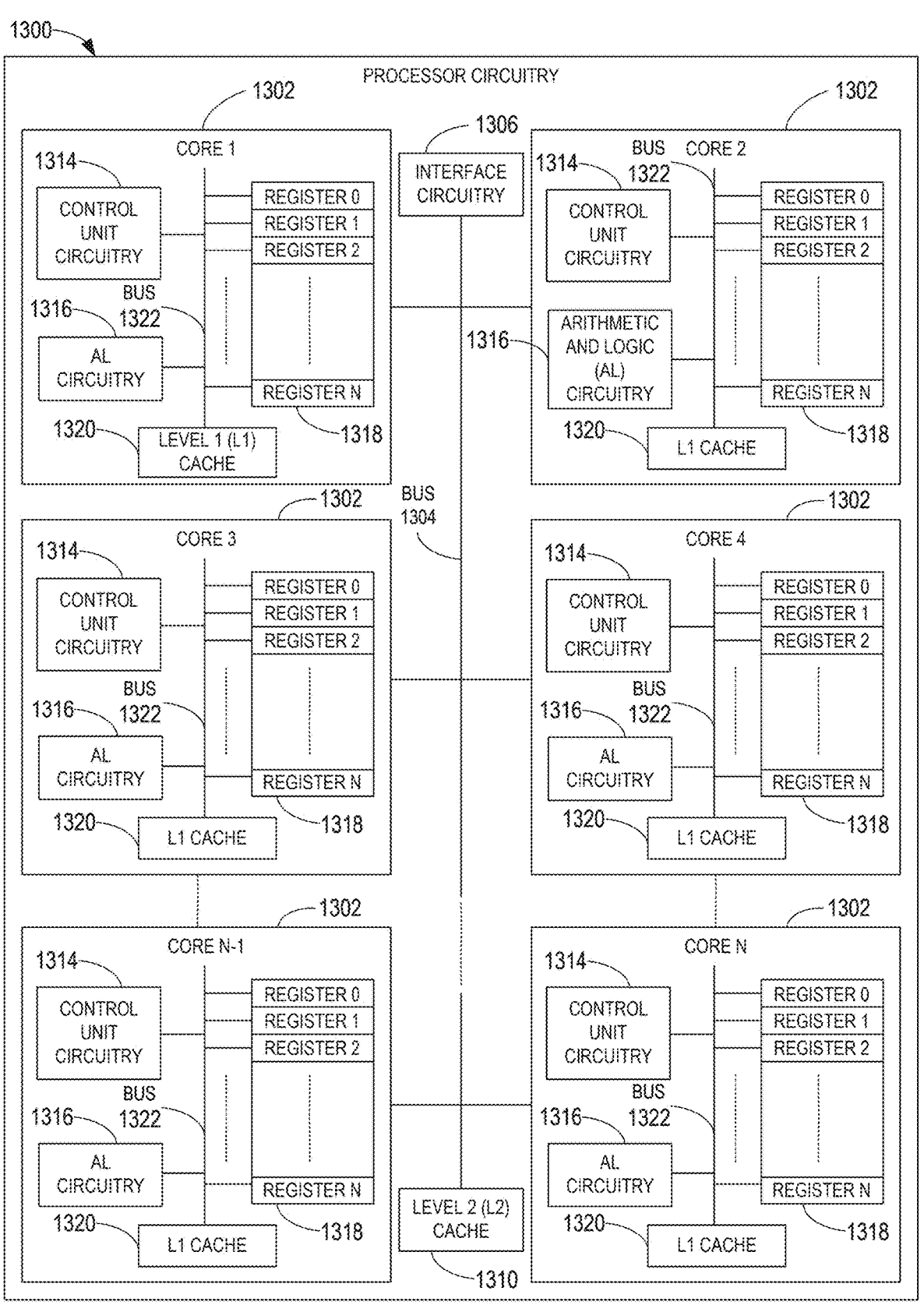
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowcharts of FIGS. 10 and 11 to effectively instantiate the circuitry of FIG. 2 as logic circuits to perform the operations corresponding to those machine readable instructions. In some such examples, the circuitry of FIGS. 1-3 are instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 10 and 11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
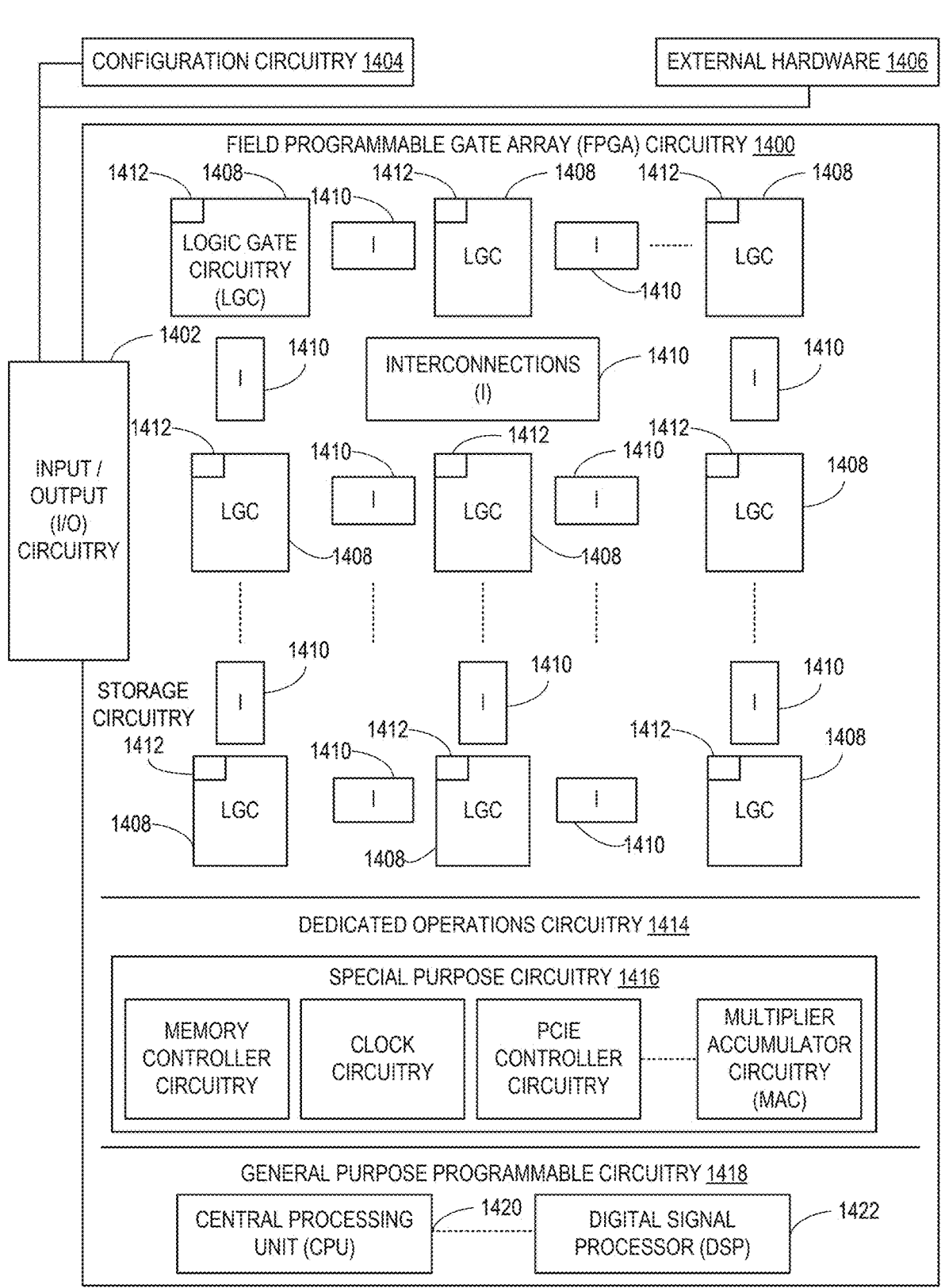
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 10 and 11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 10 and 11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 10 and 11. As such, the FPGA circuitry 1400 may be structured to effectively instantiate some or all of the machine readable instructions of the flowcharts of FIGS. 10 and 11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 10 and 11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 10 and 11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modem FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 10 and 11 may be executed by one or more of the cores 1302 of FIG. 13, a second portion of the machine readable instructions represented by the flowcharts of FIGS. 10 and 11 may be executed by the FPGA circuitry 1400 of FIG. 14, and/or a third portion of the machine readable instructions represented by the flowcharts of FIGS. 10 and 11 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
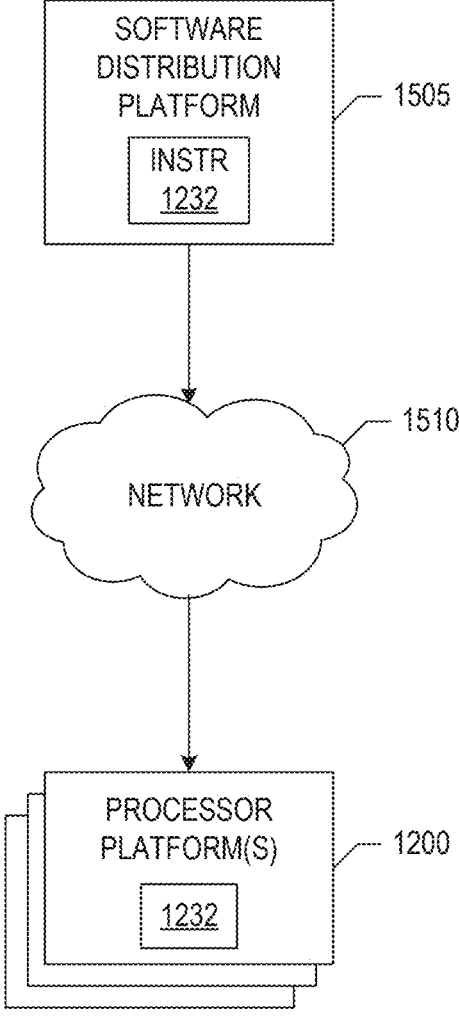
FIG. 15 is a block diagram of an example software distribution platform (e.g., one or more servers) to distribute software (e.g., software corresponding to the example machine readable instructions of FIGS. 10 and 11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 1000 of FIG. 10 and the example machine readable instructions 1008 of FIG. 11, as described above. The one or more servers of the example software distribution platform 1505 are in communication with a network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 1000 of FIG. 10 and the example machine readable instructions 1008 of FIG. 11, may be downloaded to the example processor platform 1200, which is to execute the machine readable instructions 1232 to implement the example video conferencing circuitry 112 of FIGS. 1 and/or 2 and the example interactive context frame selections circuitry 206 of FIGS. 2 and/or 3. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed to improve screen sharing based on identification of irrelevant video frames from interactive context. The disclosed systems, methods, apparatus, and articles of manufacture improve the efficiency of using a computing device by using a machine learning model to process user input and application contextual data to determine which video frame changes during a screen sharing event can be removed from the input to video conferencing systems before the video frames are processed/encoded and transmitted to the network. The disclosed systems, methods, apparatus, and articles of manufacture improve video and audio content streaming experiences during video conferencing meetings by reducing streaming glitches for network bandwidth-constrained clients/users during video data spikes due to instances of large transitions of video content (e.g., scrolling quickly, switching applications, etc.). The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve screen sharing based on identification of irrelevant video frames from interactive context are disclosed herein. Further examples and combinations thereof include the following:

Example 1 includes an apparatus comprising at least one memory, computer readable instructions, and processor circuitry to execute the computer readable instructions to process input data and application contextual data to determine an interaction classification for a classification interval in a screen sharing event initiated in a video conference, identify, based on the interaction classification, video frames of the screen sharing event that correspond to the classification interval to exclude from a transport stream for the video conference associated with the classification interval, exclude the identified video frames from the transport stream, and provide remaining video frames of the screen sharing event to a video encoder for inclusion in the transport stream.

Example 2 includes the apparatus of example 1, wherein the input data includes human interface device (HID) inputs, and wherein the HID inputs are collected from at least one of a mouse, a keyboard, or a touchpad.

Example 3 includes the apparatus of example 2, wherein the input data includes operating system events corresponding to the HID inputs.

Example 4 includes the apparatus of example 1, wherein the processor circuitry is to obtain the application contextual data by identifying an application being interacted with during the screen sharing event and identifying other applications that are open.

Example 5 includes the apparatus of example 1, wherein the processor circuitry is to determine the interaction classification for the screen sharing event by collecting a sequence of input data and a corresponding sequence of application contextual data over a period of time, and processing the sequence of input data and the corresponding sequence of application contextual data using a machine learning model to predict user interaction intent during the screen sharing event.

Example 6 includes the apparatus of example 5, wherein the machine learning model includes a plurality of weights corresponding to the application contextual data.

Example 7 includes the apparatus of example 1, wherein the interaction classification for the classification interval represents a transition in content to be rendered in the screen sharing event, and the interaction classification represents that the transition in content is not intended to be rendered in the screen sharing event.

Example 8 includes the apparatus of example 7, wherein, in response to the interaction classification representing the transition in the content is not intended to be rendered, the processor circuitry is to identify the video frames of the screen sharing event that correspond to the interaction classification by identifying video frames generated during a time period associated with the classification interval.

Example 9 includes the apparatus of example 1, wherein the input data and the application contextual data are representative of a transition of hovering a mouse over an application widget during the classification interval, and the processor circuitry is to determine the interaction classification represents that the transition is not intended to be rendered in the screen sharing event, identify the video frames of the screen sharing event that correspond to the classification interval associated with the interaction classification, and exclude the identified video frames from the transport stream.

Example 10 includes the apparatus of example 1, wherein the input data and the application contextual data are representative of a transition of scrolling in a word processing application during the classification interval, and the processor circuitry is to determine the interaction classification represents that the transition is not intended to be rendered in the screen sharing event, identify the video frames of the screen sharing event that correspond to the classification interval associated with the interaction classification, and exclude the identified video frames from the transport stream.

Example 11 includes At least one non-transitory computer readable medium comprising instructions which, when executed, cause one or more processors to at least process input data and application contextual data to determine an interaction classification for a classification interval in a screen sharing event initiated in a video conference, identify, based on the interaction classification, video frames of the screen sharing event that correspond to the classification interval to exclude from a transport stream for the video conference associated with the classification interval, exclude the identified video frames from the transport stream, and provide remaining video frames of the screen sharing event to a video encoder for inclusion in the transport stream.

Example 12 includes the at least one non-transitory computer readable medium of example 11, wherein the input data includes human interface device (HID) inputs, and wherein the HID inputs are collected from at least one of a mouse, a keyboard, or a touchpad.

Example 13 includes the at least one non-transitory computer readable medium of example 12, wherein the input data includes operating system events corresponding to the HID inputs.

Example 14 includes the at least one non-transitory computer readable medium of example 11, wherein the instructions are to cause the one or more processors to obtain the application contextual data by identifying an application being interacted with during the screen sharing event and identifying other applications that are open.

Example 15 includes the at least one non-transitory computer readable medium of example 11, wherein the instructions are to cause the one or more processors to determine the interaction classification for the screen sharing event by collecting a sequence of input data and a corresponding sequence of application contextual data over a period of time, and processing the sequence of input data and the corresponding sequence of application contextual data using a machine learning model to predict user interaction intent during the screen sharing event.

Example 16 includes the at least one non-transitory computer readable medium of example 15, wherein the machine learning model includes a plurality of weights corresponding to the application contextual data.

Example 17 includes the at least one non-transitory computer readable medium of example 11, wherein the interaction classification for the classification interval represents a transition in content to be rendered in the screen sharing event, and the interaction classification represents that the transition in content is not intended to be rendered in the screen sharing event.

Example 18 includes the at least one non-transitory computer readable medium of example 17, wherein, in response to the interaction classification representing the transition in the content is not intended to be rendered, the instructions are to cause the one or more processors to identify the video frames of the screen sharing event that correspond to the interaction classification by identifying video frames generated during a time period associated with the classification interval.

Example 19 includes a method comprising processing input data and application contextual data to determine an interaction classification for a classification interval in a screen sharing event initiated in a video conference, identifying, based on the interaction classification, video frames of the screen sharing event that correspond to the classification interval to exclude from a transport stream for the video conference associated with the classification interval, excluding the identified video frames from the transport stream, and providing remaining video frames of the screen sharing event to a video encoder for inclusion in the transport stream.

Example 20 includes the method of example 19, wherein the input data includes human interface device (HID) inputs, and wherein the HID inputs are collected from at least one of a mouse, a keyboard, or a touchpad.

Example 21 includes the method of example 20, wherein the input data includes operating system events corresponding to the HID inputs.

Example 22 includes the method of example 19, further including obtaining the application contextual data by identifying an application being interacted with during the screen sharing event and identifying other applications that are open.

Example 23 includes the method of example 19, further including determining the interaction classification for the screen sharing event by collecting a sequence of input data and a corresponding sequence of application contextual data over a period of time, and processing the sequence of input data and the corresponding sequence of application contextual data using a machine learning model to predict user interaction intent during the screen sharing event.

Example 24 includes the method of example 23, wherein the machine learning model includes a plurality of weights corresponding to the application contextual data.

Example 25 includes the method of example 19, wherein the interaction classification for the classification interval represents a transition in content to be rendered in the screen sharing event, and the interaction classification represents that the transition in content is not intended to be rendered in the screen sharing event.

Example 26 includes the method of example 25, further including, in response to the interaction classification representing the transition in the content is not intended to be rendered, identifying the video frames of the screen sharing event that correspond to the interaction classification by identifying video frames generated during a time period associated with the classification interval.

Example 27 includes an apparatus comprising machine learning model controller circuitry to process input data and application contextual data to determine an interaction classification for a classification interval in a screen sharing event initiated in a video conference, and frame selection circuitry to identify, based on the interaction classification, video frames of the screen sharing event that correspond to the classification interval to exclude from a transport stream for the video conference associated with the classification interval, exclude the identified video frames from the transport stream, and provide remaining video frames of the screen sharing event to a video encoder for inclusion in the transport stream.

Example 28 includes the apparatus of example 27, wherein the input data includes human interface device (HID) inputs, and wherein the HID inputs are collected from at least one of a mouse, a keyboard, or a touchpad.

Example 29 includes the apparatus of example 28, further including operating system (OS) determination circuitry to obtain operating system events corresponding to the HID inputs, the operating system events included in the input data.

Example 30 includes the apparatus of example 27, further including application identification circuitry to obtain the application contextual data by identifying an application being interacted with during the screen sharing event and identifying other applications that are open.

Example 31 includes the apparatus of example 27, further including interaction determination circuitry to determine the interaction classification for the screen sharing event, wherein the apparatus further includes input determination circuitry to collect a sequence of input data over a period of time, and application identification circuitry to collect a corresponding sequence of application contextual data over the period of time, wherein the machine learning model controller circuitry is to process the sequence of input data and the corresponding sequence of application contextual data using a machine learning model to predict user interaction intent during the screen sharing event.

Example 32 includes the apparatus of example 31, wherein the machine learning model includes a plurality of weights corresponding to the application contextual data.

Example 33 includes the apparatus of example 27, wherein the interaction classification for the classification interval represents a transition in content to be rendered in the screen sharing event, and the interaction classification represents that the transition in the content is not intended to be rendered in the screen sharing event.

Example 34 includes the apparatus of example 33, wherein, in response to the interaction classification representing the transition in the content is not intended to be rendered, the frame selection circuitry is to identify the video frames of the screen sharing event that correspond to the interaction classification by identifying video frames generated during a time period associated with the classification interval.

Example 35 includes an apparatus comprising means for processing input data and application contextual data to determine an interaction classification for a classification interval in a screen sharing event initiated in a video conference, and means for selecting video frames, the means for selecting to identify, based on the interaction classification, video frames of the screen sharing event that correspond to the classification interval to exclude from a transport stream for the video conference associated with the classification interval, exclude the identified video frames from the transport stream, and provide remaining video frames of the screen sharing event to a video encoder for inclusion in the transport stream.

Example 36 includes the apparatus of example 35, wherein the input data includes human interface device (HID) inputs, and wherein the HID inputs are collected from at least one of a mouse, a keyboard, or a touchpad.

Example 37 includes the apparatus of example 36, further including third means for obtaining operating system events corresponding to the HID inputs, the operating system events included in the input data.

Example 38 includes the apparatus of example 35, further including means for obtaining the application contextual data by identifying an application being interacted with during the screen sharing event and identifying other applications that are open.

Example 39 includes the apparatus of example 35, further including means for determining the interaction classification for the screen sharing event, wherein the apparatus further includes first means for obtaining a sequence of input data over a period of time, and second means for obtaining a corresponding sequence of application contextual data over the period of time, wherein the means for processing is to process the sequence of input data and the corresponding sequence of application contextual data using a machine learning model to predict user interaction intent during the screen sharing event.

Example 40 includes the apparatus of example 37, wherein the machine learning model includes a plurality of weights corresponding to the application contextual data.

Example 41 includes the apparatus of example 35, wherein the interaction classification for the classification interval represents a transition in content to be rendered in the screen sharing event, and the interaction classification represents that the transition in content is not intended to be rendered in the screen sharing event.

Example 42 includes the apparatus of example 41, wherein, in response to the interaction classification representing the transition in the content is not intended for the screen sharing event, the means for selecting is to identify the video frames from the screen sharing event that correspond to the interaction classification by identifying video frames generated during a time period associated with the interaction classification.

Example 43 includes an apparatus comprising interface circuitry, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate machine learning model controller circuitry to process input data and application contextual data to determine an interaction classification for a classification interval in a screen sharing event initiated in a video conference, and frame selection circuitry to identify, based on the interaction classification, video frames of the screen sharing event that correspond to the classification interval to exclude from a transport stream for the video conference associated with the classification interval, exclude the identified video frames from the transport stream, and provide remaining video frames of the screen sharing event to a video encoder for inclusion in the transport stream.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   computer readable instructions; and
   at least one processor circuit to be programmed based on the computer readable instructions to:
      input a sequence of user input data and a corresponding sequence of application contextual data into a machine learning model to determine an interaction classification associated with a screen sharing event initiated in a video conference, the interaction classification representing a content transition that is not intended to be rendered in the screen sharing event;
      identify, based on the interaction classification, video frames of the screen sharing event to exclude from a transport stream for the video conference;
      exclude the identified video frames from the transport stream; and
      provide remaining video frames of the screen sharing event to a video encoder, the video encoder to include the remaining video frames in the transport stream.

2. The apparatus of claim 1, wherein the user input data is collected from at least one of a mouse, a keyboard, or a touchpad.

3. The apparatus of claim 2, wherein one or more of the at least one processor circuit is to also input operating system events corresponding to the user input data into the machine learning model to determine the interaction classification.

4. The apparatus of claim 1, wherein one or more of the at least one processor circuit is to obtain the application contextual data by at least one of identifying an application being presented during the screen sharing event, or identifying one or more applications that are open during the screen sharing event.

5. The apparatus of claim 1, wherein one or more of the at least one processor circuit is to collect the sequence of user input data and the corresponding sequence of application contextual data over a period of time, and the machine learning model is to predict user interaction intent during the screen sharing event.

6. The apparatus of claim 1, wherein the machine learning model includes a plurality of weights corresponding to the application contextual data.

7. The apparatus of claim 1, wherein one or more of the at least one processor circuit is to identify the video frames of the screen sharing event to exclude from the transport stream by identifying video frames generated during a time period associated with the content transition.

8. The apparatus of claim 1, wherein the user input data and the application contextual data are representative of a content transition associated with hovering a mouse over an application widget, and one or more of the at least one processor circuit is to:

identify the video frames of the screen sharing event that correspond to the content transition are the video frames to exclude from the transport stream.

9. The apparatus of claim 1, wherein the user input data and the application contextual data are representative of a content transition associated with scrolling in a word processing application, and one or more of the at least one processor circuit is to:

identify the video frames of the screen sharing event that correspond to the content transition are the video frames to exclude from the transport stream.

10. At least one non-transitory computer readable medium comprising instructions to cause at least one processor circuit to at least:

execute a machine learning model based on a sequence of user input data and a corresponding sequence of application contextual data to determine an interaction classification associated with a screen sharing event initiated in a video conference, the interaction classification representing a content transition that is not intended to be rendered in the screen sharing event;

identify, based on the interaction classification, video frames of the screen sharing event to exclude from a transport stream for the video conference;

exclude the identified video frames from the transport stream; and provide remaining video frames of the screen sharing event to a video encoder, the video encoder to include the remaining video frames in the transport stream.

11. The at least one non-transitory computer readable medium of claim 10, wherein the user input data is collected from at least one of a mouse, a keyboard, or a touchpad.

12. The at least one non-transitory computer readable medium of claim 11, wherein the instructions are to cause one or more of the at least one processor circuit to input operating system events corresponding to the user input data into the machine learning model to determine the interaction classification.

13. The at least one non-transitory computer readable medium of claim 10, wherein the instructions are to cause one or more of the at least one processor circuit to obtain the application contextual data by at least one of identifying an application being presented during the screen sharing event, or identifying one or more applications that are open during the screen sharing event.

14. The at least one non-transitory computer readable medium of claim 10, wherein the instructions are to cause one or more of the at least one processor circuit to collect the sequence of user input data and the corresponding sequence of application contextual data over a period of time, and the machine learning model is to predict user interaction intent during the screen sharing event.

15. The at least one non-transitory computer readable medium of claim 10, wherein the instructions are to cause the one or more of the at least one processor circuit to identify the video frames of the screen sharing event to exclude from the transport stream by identifying video frames generated during a time period associated with the content transition.

16. A method comprising:

executing a machine learning model based on a sequence of user input data and a corresponding sequence of application contextual data to determine an interaction classification associated with a screen sharing event initiated in a video conference, the interaction classification represents a content transition that is not intended to be rendered in the screen sharing event;

identifying, based on the interaction classification, video frames of the screen sharing event to exclude from a transport stream for the video conference;

excluding the identified video frames from the transport stream; and including remaining video frames of the screen sharing event in the transport stream.

17. The method of claim 16, wherein the user input data is collected from at least one of a mouse, a keyboard, or a touchpad.

18. The method of claim 17, including inputting operating system events corresponding to the user input data into the machine learning model to determine the interaction classification.

19. The method of claim 16, including obtaining the application contextual data by at least one of identifying an application being presented during the screen sharing event, or identifying one or more applications that are open during the screen sharing event.

20. The method of claim 16, including collecting the sequence of user input data and the corresponding sequence of application contextual data over a period of time, and the machine learning model is to predict user interaction intent during the screen sharing event.

21. The method of claim 16, including identifying the video frames of the screen sharing event to exclude from the transport stream by identifying video frames generated during a time period associated with the content transition.

22. An apparatus comprising:

machine learning model controller circuitry to process a sequence of input data and a corresponding sequence of application contextual data with a machine learning model to determine an interaction classification associated with a screen sharing event initiated in a video conference, the interaction classification represents a content transition that is not intended to be rendered in the screen sharing event; and frame selection circuitry to:

identify, based on the interaction classification, video frames of the screen sharing event to exclude from a transport stream for the video conference;

exclude the identified video frames from the transport stream; and provide remaining video frames of the screen sharing event to a video encoder, the video encoder to include the remaining video frames in the transport stream.

* * * * *